(12) United States Patent
Oya

(10) Patent No.: US 10,511,740 B2
(45) Date of Patent: Dec. 17, 2019

(54) IMAGE PROCESSING APPARATUS, METHOD THEREOF, AND IMAGE FORMING APPARATUS THAT DETERMINE A DOT ARRANGEMENT OF PRINTING MATERIAL BY HALFTONE PROCESSING

(71) Applicant: CANON KABUSHIKI KAISHA, Tokyo (JP)

(72) Inventor: Masashi Oya, Soka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/757,030

(22) PCT Filed: Aug. 15, 2016

(86) PCT No.: PCT/JP2016/003741
§ 371 (c)(1),
(2) Date: Mar. 2, 2018

(87) PCT Pub. No.: WO2017/047003
PCT Pub. Date: Mar. 23, 2017

(65) Prior Publication Data
US 2019/0068832 A1 Feb. 28, 2019

(30) Foreign Application Priority Data
Sep. 15, 2015 (JP) .................. 2015-182227

(51) Int. Cl.
*H04N 1/40* (2006.01)
*B41J 2/21* (2006.01)
(Continued)

(52) U.S. Cl.
CPC .......... *H04N 1/40087* (2013.01); *B41J 2/205* (2013.01); *B41J 2/2052* (2013.01);
(Continued)

(58) Field of Classification Search
CPC .... H04N 1/40087; H04N 1/52; H04N 1/6097; B41J 2/2114
See application file for complete search history.

(56) References Cited

U.S. PATENT DOCUMENTS 8,876,254 B2 11/2014 Nishikawa
2004/0169710 A1 9/2004 Ide et al.
(Continued)

FOREIGN PATENT DOCUMENTS

JP 2007-203491 A 8/2007
JP 2008-213271 A 9/2008
(Continued)

OTHER PUBLICATIONS

International Search Reporting and Written Opinion dated Nov. 1, 2016, issued in corresponding International Application No. PCT/JP2016/003741.
(Continued)

*Primary Examiner* — Neil R McLean
(74) *Attorney, Agent, or Firm* — Venable LLP

(57) ABSTRACT

An image processing apparatus includes at least one memory storing instructions and at least one processor executing the instructions to provide an input unit configured to input image data representing a color of an image, and information identifying high gloss and low gloss areas in the image, a first determination unit configured to determine, based on the image data, a recording amount of a printing material for forming the image on a recording medium, and a second determination unit configured to determine a dot arrangement of the printing material by halftone processing for the recording amount according to the information.

18 Claims, 17 Drawing Sheets

(51) Int. Cl.
  H04N 1/54    (2006.01)
  H04N 1/52    (2006.01)
  H04N 1/60    (2006.01)
  B41J 2/205   (2006.01)
  G06K 15/10   (2006.01)
  H04N 1/405   (2006.01)
  G06K 15/02   (2006.01)
  B41J 19/14   (2006.01)

(52) U.S. Cl.
  CPC ............ *B41J 2/2114* (2013.01); *B41J 2/2117* (2013.01); *B41J 2/2132* (2013.01); *G06K 15/021* (2013.01); *G06K 15/107* (2013.01); *G06K 15/1823* (2013.01); *H04N 1/4051* (2013.01); *H04N 1/4053* (2013.01); *H04N 1/4055* (2013.01); *H04N 1/52* (2013.01); *H04N 1/54* (2013.01); *H04N 1/6097* (2013.01); *B41J 2/2054* (2013.01); *B41J 19/142* (2013.01)

(56) References Cited

U.S. PATENT DOCUMENTS

| | | |
|---|---|---|
| 2009/0262159 A1 | 10/2009 | Lang |
| 2010/0014120 A1* | 1/2010 | Nishiyama ........... H04N 1/4052 358/3.01 |
| 2011/0242176 A1 | 10/2011 | Iritani et al. |
| 2012/0038698 A1* | 2/2012 | Nishikawa ............. B41J 2/2132 347/16 |
| 2012/0050369 A1* | 3/2012 | Seki ....................... B41J 2/2114 347/15 |
| 2012/0212754 A1 | 8/2012 | Hirata et al. |
| 2013/0300785 A1 | 11/2013 | Tsuchiya et al. |
| 2013/0300788 A1 | 11/2013 | Konno et al. |
| 2015/0054874 A1 | 2/2015 | Yanai |
| 2015/0062235 A1 | 3/2015 | Yano |
| 2015/0062654 A1 | 3/2015 | Ono et al. |
| 2015/0346393 A1* | 12/2015 | Sekine ................. G02B 3/0037 359/619 |

FOREIGN PATENT DOCUMENTS

| | | |
|---|---|---|
| JP | 2010-023291 A | 2/2010 |
| JP | 2010-120185 A | 6/2010 |
| JP | 2012-035603 A | 2/2012 |

OTHER PUBLICATIONS

Extended European Search Report dated Mar. 29, 2019, issued in corresponding European Patent Application No. 16845881.8.
Office Action issued in Japanese Patent Application No. 2015-182227, dated Aug. 23, 2019 (with machine translation).

* cited by examiner

[Fig. 1A]
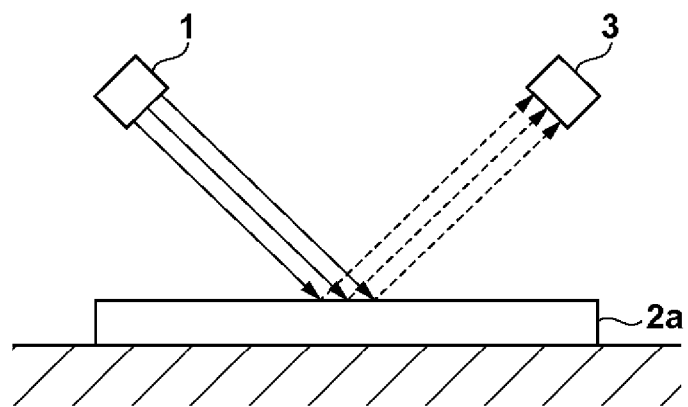
[Fig. 1B]
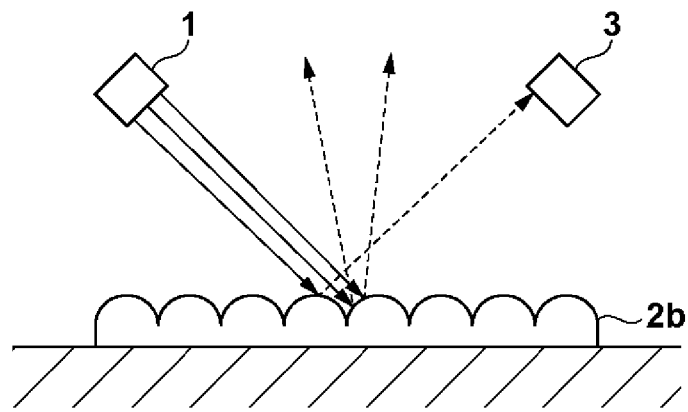

[Fig. 2]
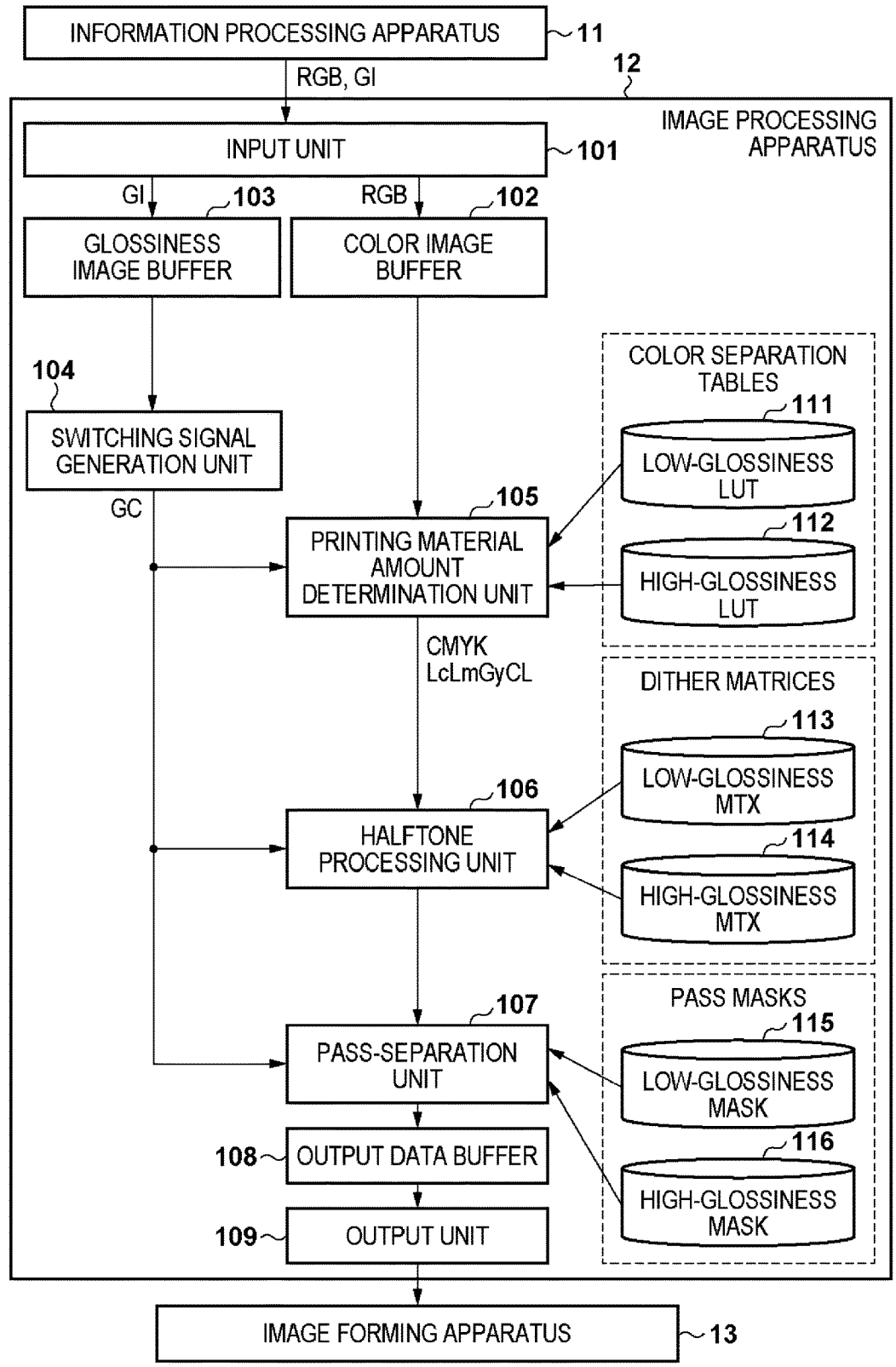

[Fig. 3]
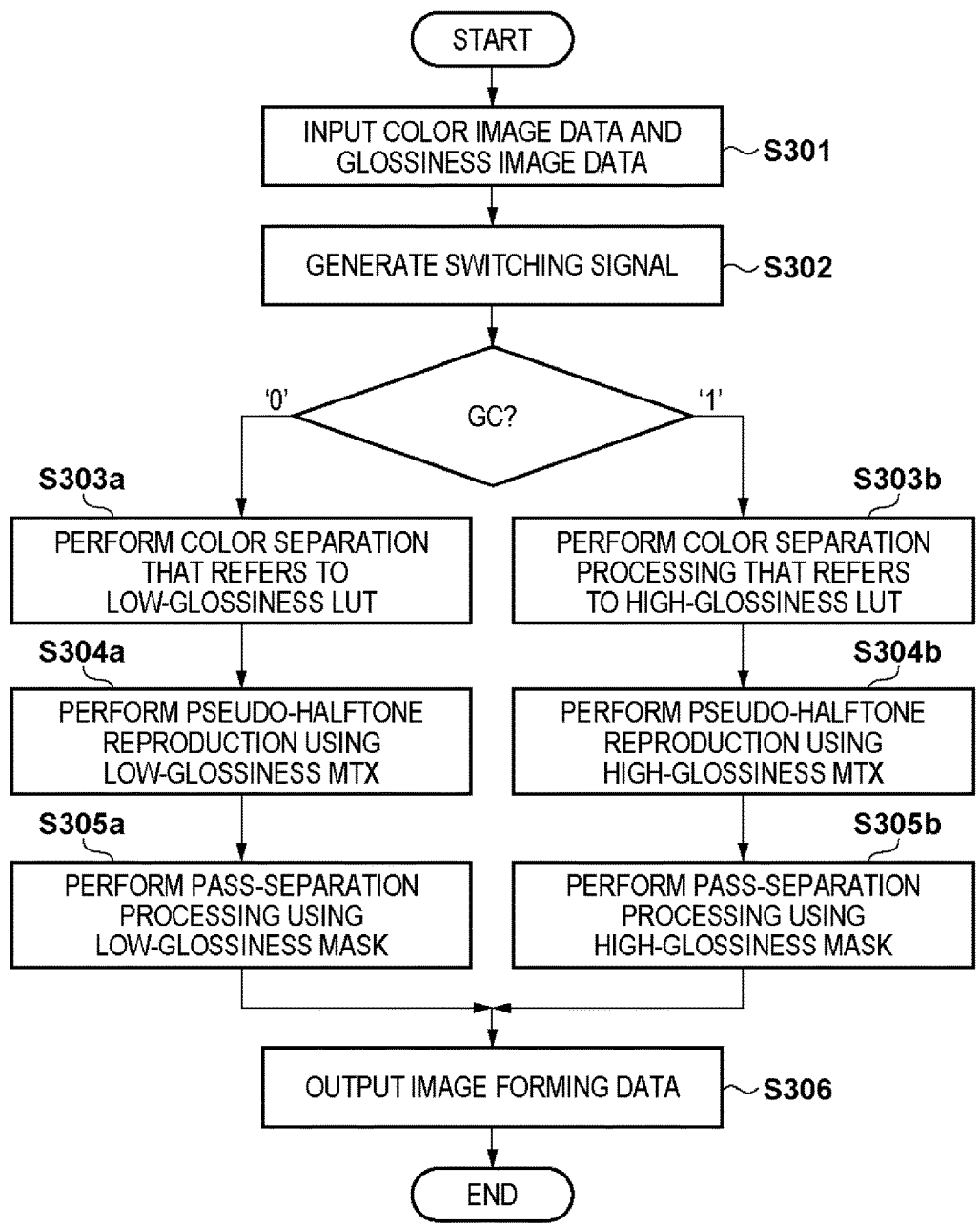

[Fig. 4]
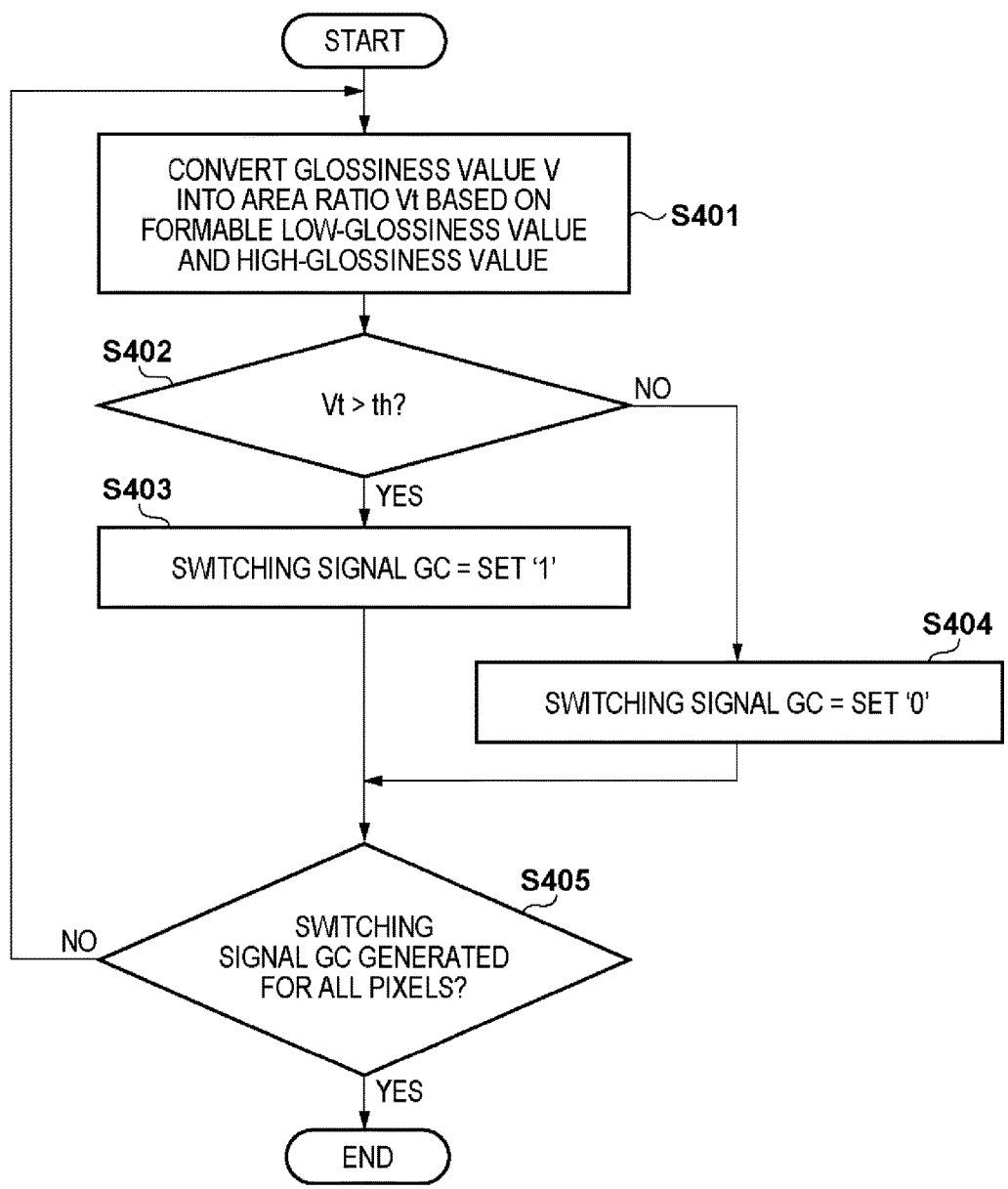

[Fig. 5]
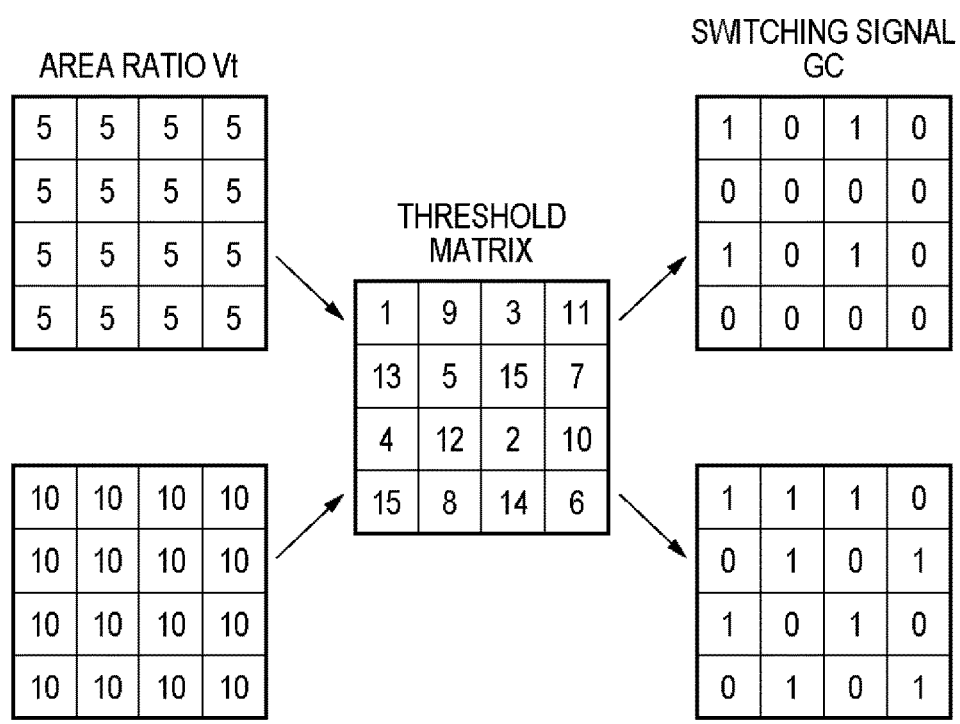

[Fig. 6A]

| LOW-GLOSSINESS LUT ||||||||||
|---|---|---|---|---|---|---|---|---|---|
| INPUT SIGNAL VALUE (8bit) ||| PRINTING MATERIAL AMOUNT (8bit) |||||||
| R | G | B | C | M | Y | K | Lm | Lc | Gy | CL |
| 0 | 0 | 0 | 0 | 0 | 0 | 255 | 0 | 0 | 0 | 0 |
| 0 | 0 | 16 | 16 | 16 | 0 | 240 | 0 | 0 | 0 | 0 |
| 0 | 0 | 32 | 32 | 32 | 0 | 224 | 0 | 0 | 0 | 0 |
| ⋮ | ⋮ | ⋮ | ⋮ | ⋮ | ⋮ | ⋮ | ⋮ | ⋮ | ⋮ | ⋮ |
| 255 | 255 | 255 | 0 | 0 | 0 | 0 | 0 | 0 | 0 | 255 |

[Fig. 6B]

| HIGH-GLOSSINESS LUT ||||||||||
|---|---|---|---|---|---|---|---|---|---|
| INPUT SIGNAL VALUE (8bit) ||| PRINTING MATERIAL AMOUNT (8bit) |||||||
| R | G | B | C | M | Y | K | Lm | Lc | Gy | CL |
| 0 | 0 | 0 | 0 | 0 | 0 | 192 | 0 | 0 | 96 | 0 |
| 0 | 0 | 16 | 8 | 8 | 0 | 176 | 12 | 12 | 96 | 0 |
| 0 | 0 | 32 | 16 | 16 | 0 | 160 | 24 | 24 | 96 | 0 |
| ⋮ | ⋮ | ⋮ | ⋮ | ⋮ | ⋮ | ⋮ | ⋮ | ⋮ | ⋮ | ⋮ |
| 255 | 255 | 255 | 0 | 0 | 0 | 0 | 0 | 0 | 0 | 0 |

[Fig. 7A]
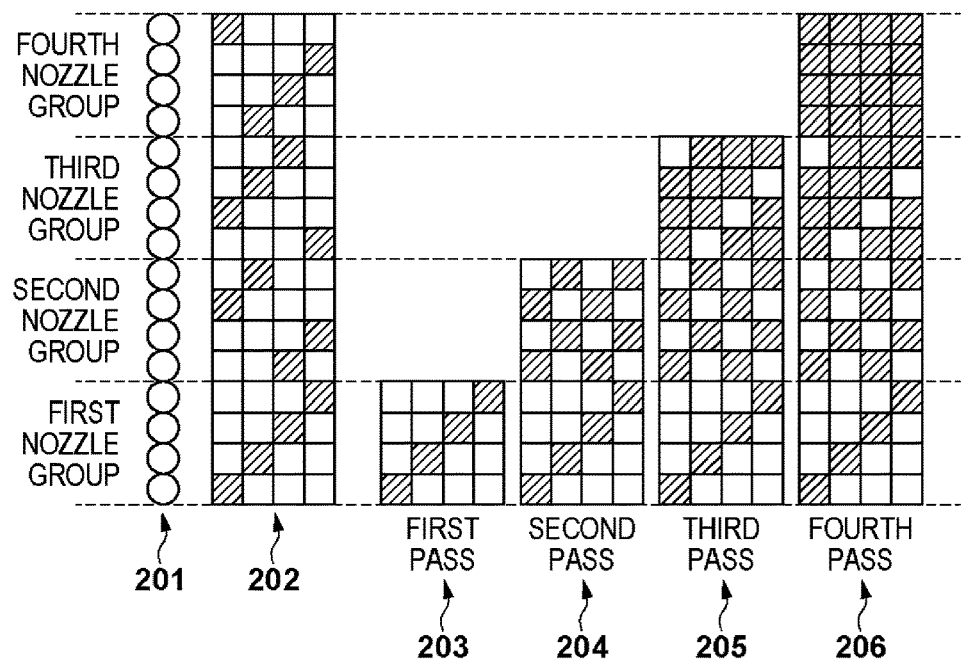
[Fig. 7B]
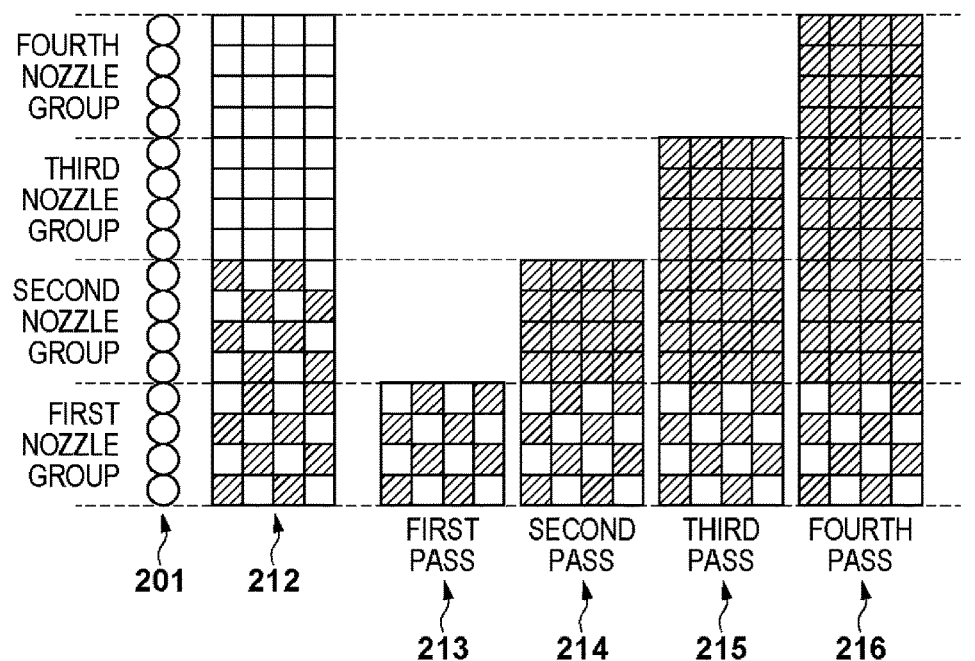

[Fig. 8]

| IMAGE<br>IMAGE<br>PROCESSING | LOW-GLOSSINESS AREA | HIGH-GLOSSINESS AREA |
|---|---|---|
| COLOR SEPARATION PROCESSING | USE OF MANY DARK PRINTING MATERIALS | USE OF MANY LIGHT PRINTING MATERIALS |
| HALFTONE PROCESSING | DOT-DISPERSED TYPE | DOT-CONVERGED TYPE |
| PASS-SEPARATION PROCESSING | LARGE LANDING TIMING DIFFERENCE | SMALL LANDING TIMING DIFFERENCE |
| PRINTING CONTROL | PRE-PRINTED CLEAR COLOR MATERIAL + DOT OVERLAY | CLEAR MATERIAL FILLING |
| SURFACE SHAPE OF PRINTED MATERIAL | BECOMES ROUGH | BECOMES SMOOTH |

[Fig. 9]
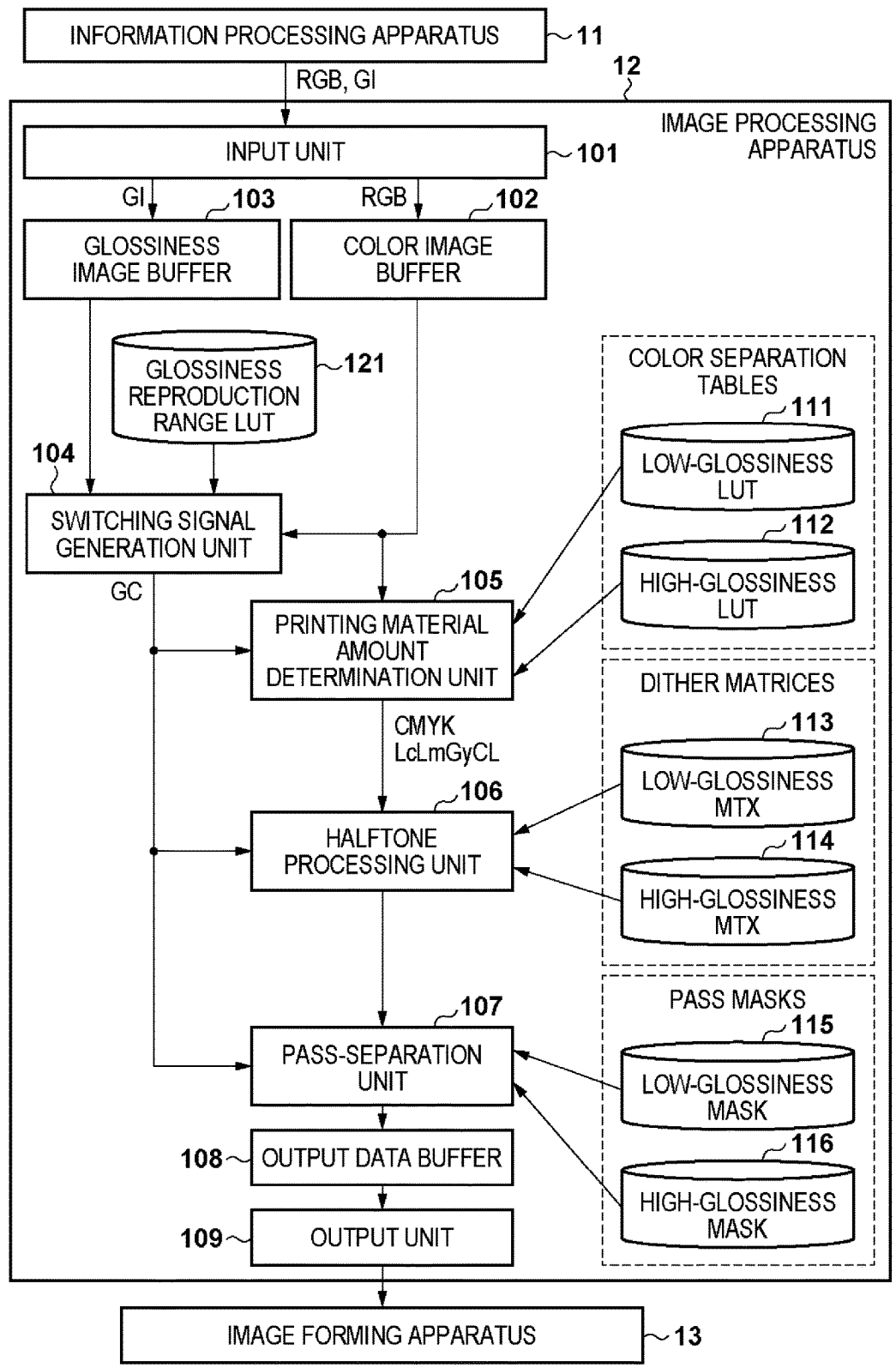

[Fig. 10]

| GLOSSINESS REPRODUCTION RANGE TABLE ||||||
| R | G | B | LOW-GLOSSINESS VALUE L | HIGH-GLOSSINESS VALUE H |
|---|---|---|---|---|
| 0 | 0 | 0 | 38 | 65 |
| 0 | 0 | 16 | 40 | 63 |
| 0 | 0 | 32 | 39 | 64 |
| ... | ... | ... | ... | ... |
| 255 | 255 | 255 | 51 | 80 |

[Fig. 11]
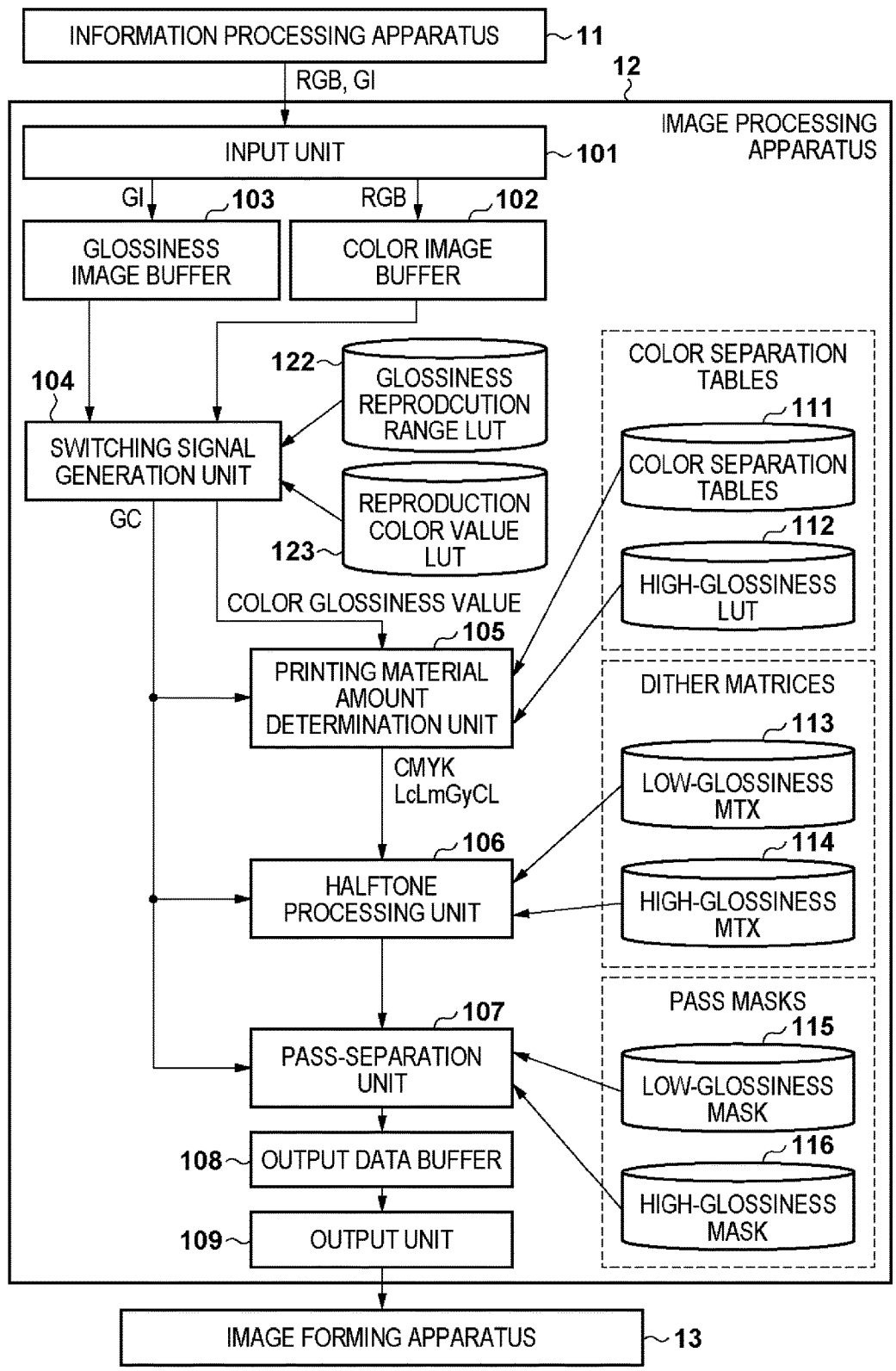

[Fig. 12A]

| LOW-GLOSSINESS IMAGE PROCESSING | | | | HIGH-GLOSSINESS IMAGE PROCESSING | | | |
|---|---|---|---|---|---|---|---|
| L | a | b | LOW-GLOSSINESS VALUE Lc | L | a | b | HIGH-GLOSSINESS VALUE Hc |
| 15 | 0 | 2 | 38 | 18 | 5 | 0 | 65 |
| . | . | . | . | . | . | . | . |
| 20 | 0 | 5 | 40 | 21 | 0 | 10 | 63 |
| . | . | . | . | . | . | . | . |
| 28 | 5 | 3 | 39 | 27 | 0 | 2 | 64 |
| . | . | . | . | . | . | . | . |
| 94 | 1 | 2 | 51 | 95 | 0 | 5 | 80 |

[Fig. 12B]

| INPUT SIGNAL VALUE (8bit) | | | OUTPUT SIGNAL VALUE (8bit) | | |
|---|---|---|---|---|---|
| R | G | B | L | a | b |
| 0 | 0 | 0 | 10 | 0 | 0 |
| . | . | . | . | . | . |
| 16 | 16 | 16 | 16 | 0 | 0 |
| . | . | . | . | . | . |
| 32 | 32 | 32 | 22 | 0 | 0 |
| . | . | . | . | . | . |
| 255 | 255 | 255 | 94 | 0 | 0 |

[Fig. 13]
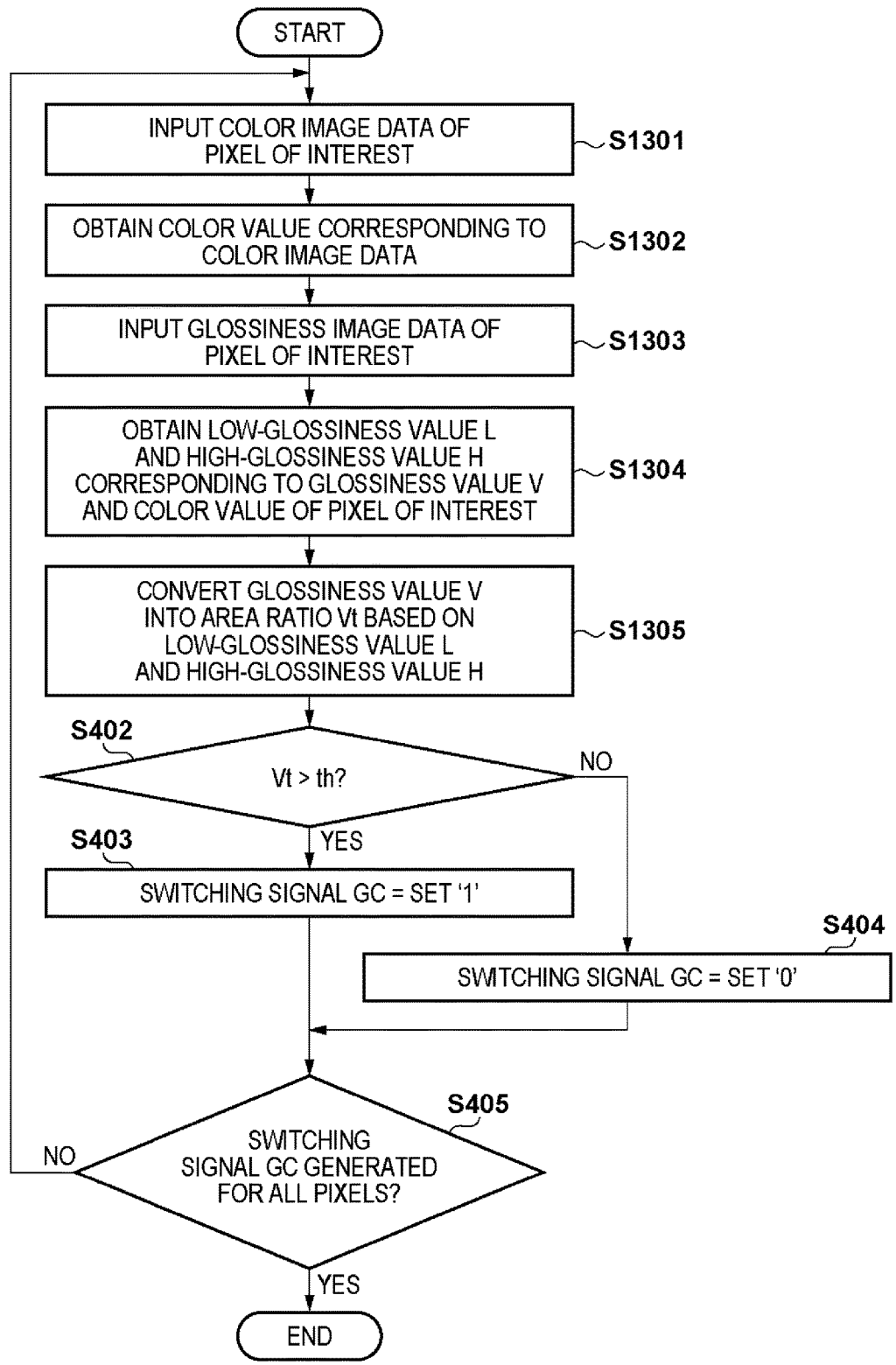

[Fig. 14]
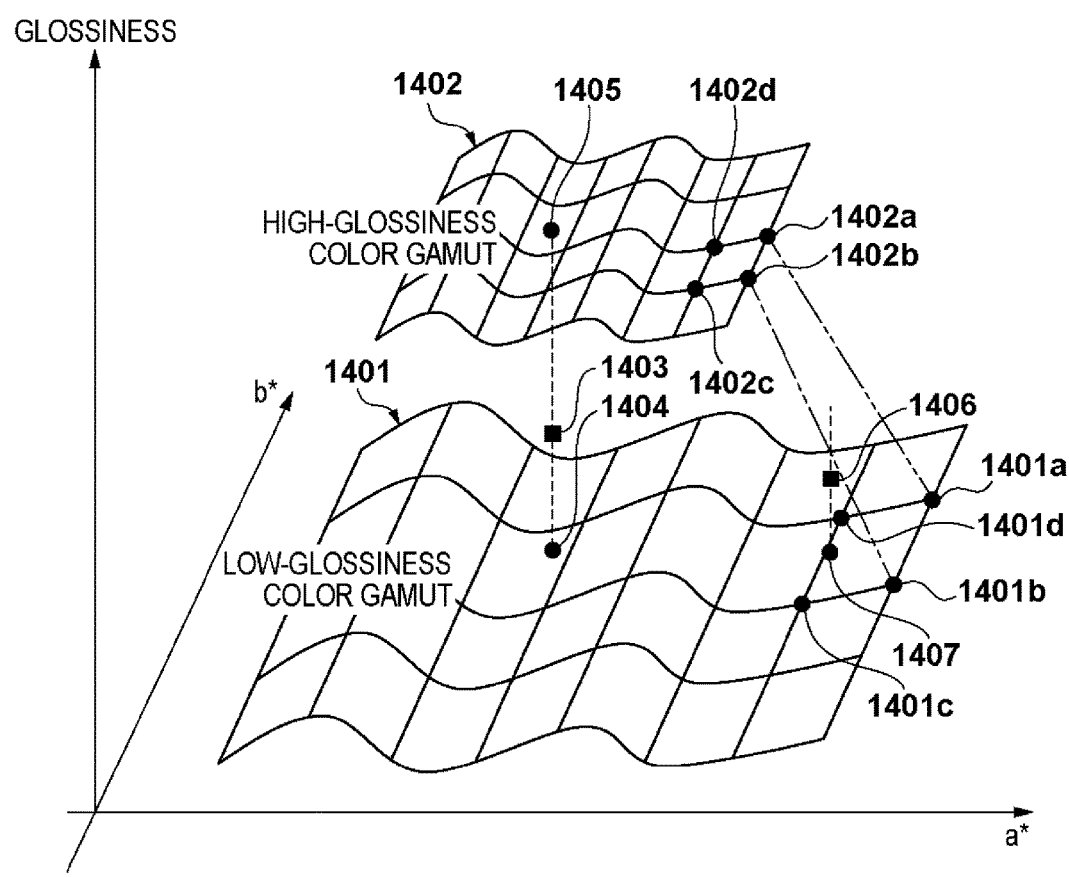

[Fig. 15]
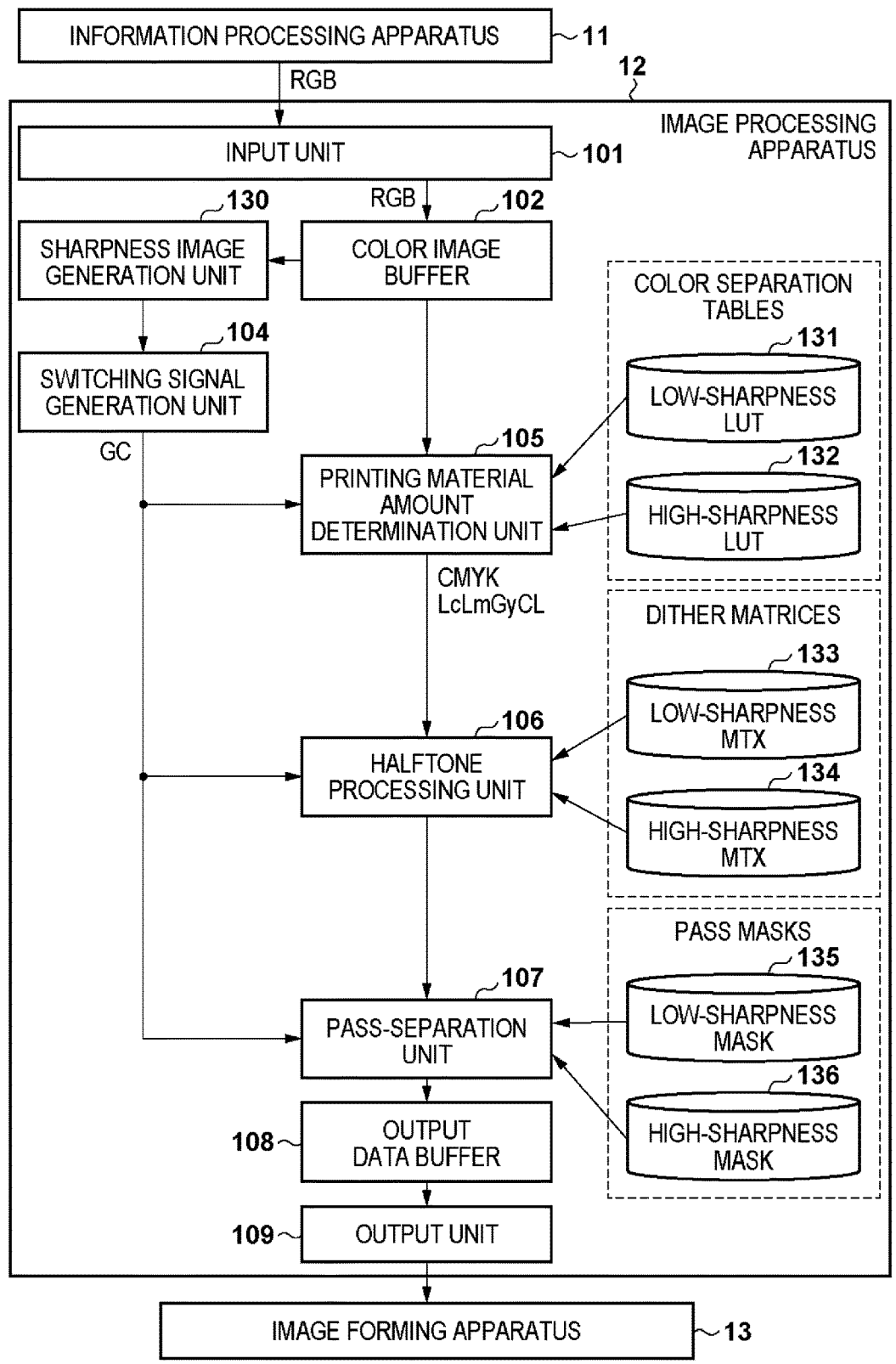

[Fig. 16]
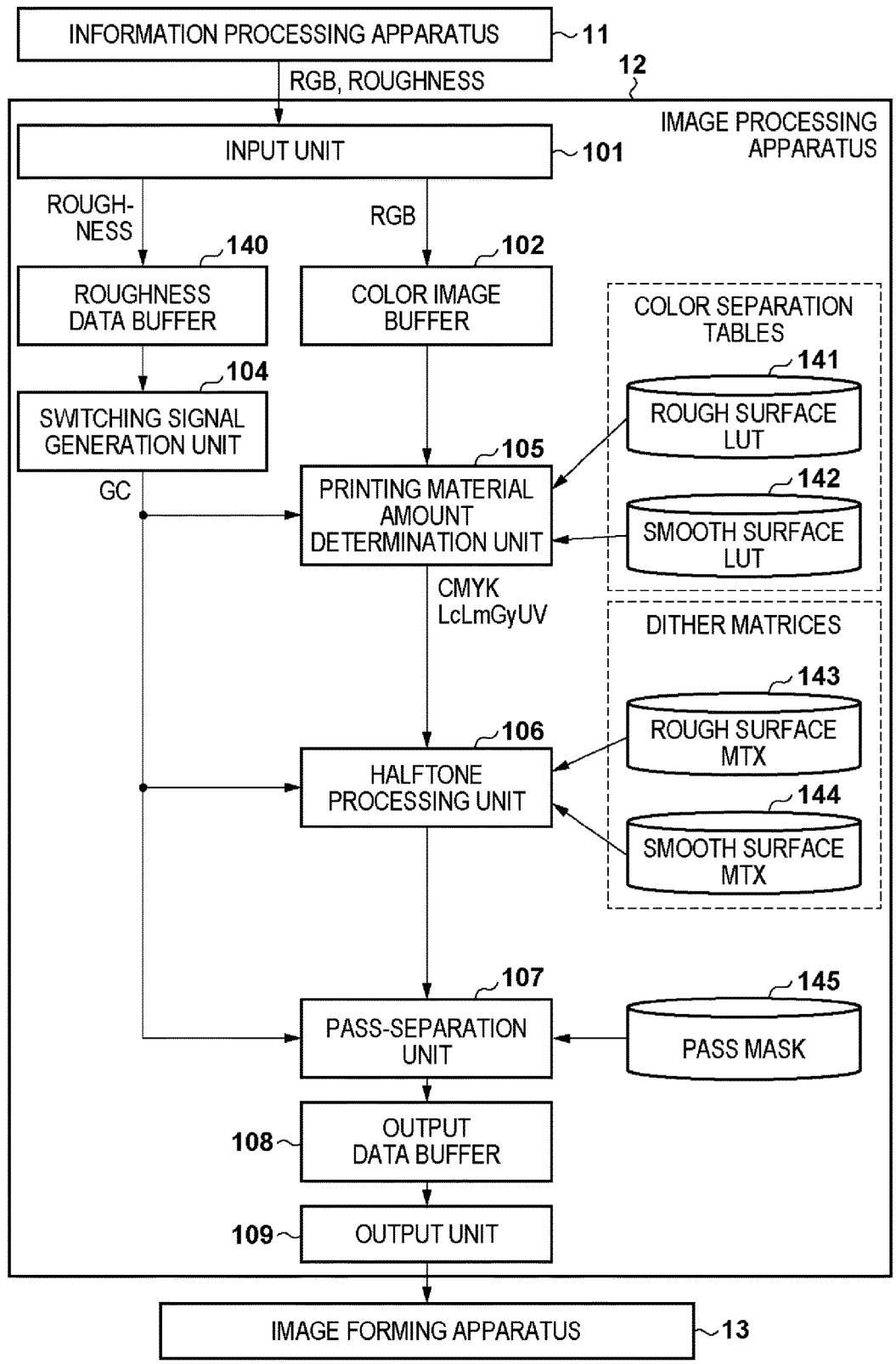

[Fig. 17]
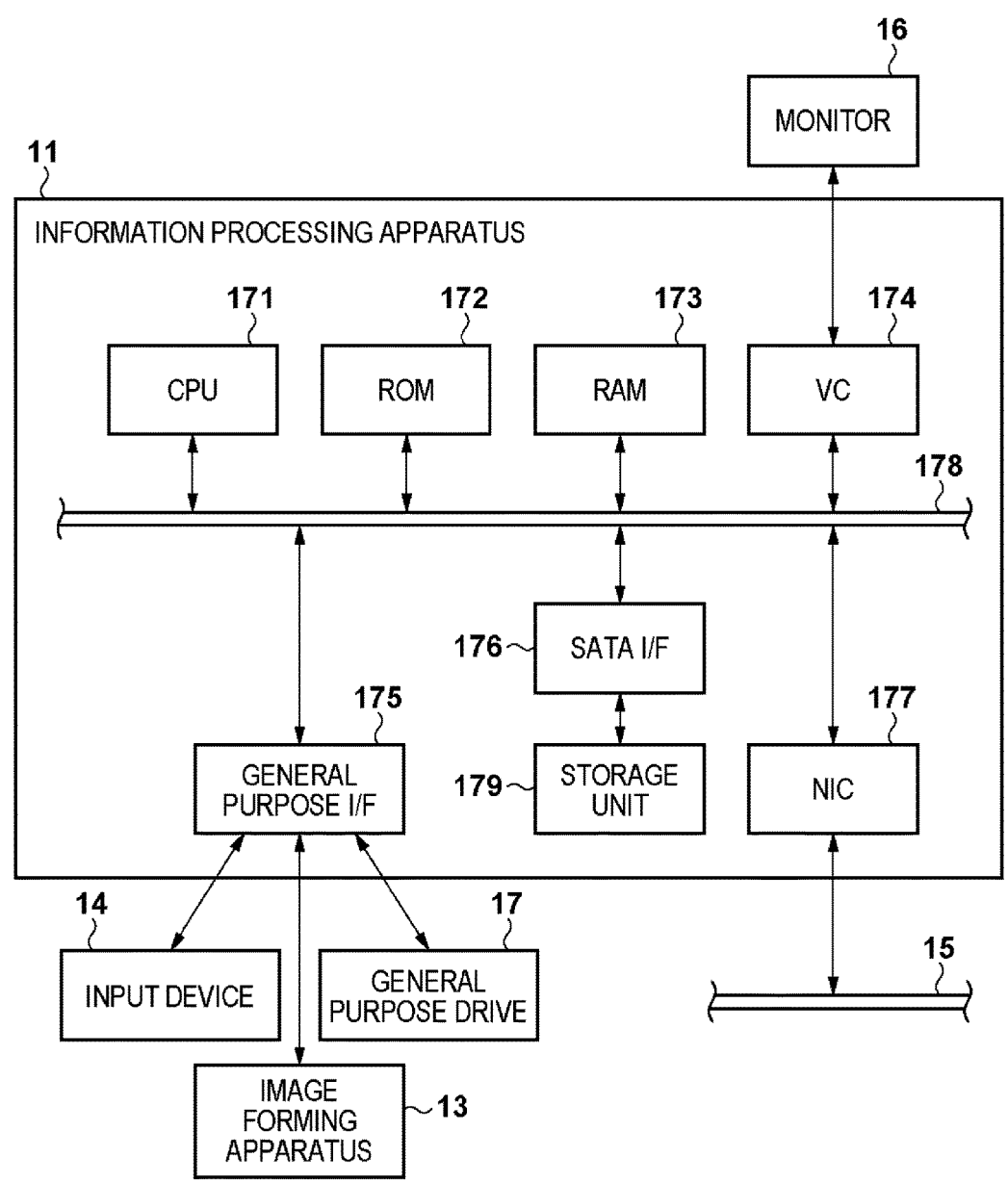

IMAGE PROCESSING APPARATUS, METHOD THEREOF, AND IMAGE FORMING APPARATUS THAT DETERMINE A DOT ARRANGEMENT OF PRINTING MATERIAL BY HALFTONE PROCESSING

CLAIM TO PRIORITY

This application is a U.S. national stage application of PCT International Application No. PCT/JP2016/003741, filed Aug. 15, 2016, which claims priority from Japanese Patent Application No. 2015-182227, filed Sep. 15, 2015.

TECHNICAL FIELD

The present invention relates to control of glossiness of an image to be formed.

BACKGROUND OF THE INVENTION

In the field of commercial printing, there is a rising demand to customize and to increase the quality of a printed material. As the methods of implementing this demand, there are techniques to control the glossiness of a printed material. As such techniques, a method of controlling the use amount of a glossiness adjustment material (Japanese Patent Laid-Open No. 2008-213271), a method of implementing a uniform glossiness by controlling the concentration degree of a dot arrangement (Japanese Patent Laid-Open No. 2010-120185), and a method of implementing a uniform glossiness by changing the number of printing scans for each color material (Japanese Patent Laid-Open No. 2012-035603) are known. In each of these techniques, it is necessary to perform glossiness control and to prevent image quality degradation of a color image.

According to the technique of Japanese Patent Laid-Open No. 2010-120185, although it is possible to control glossiness in a predetermined area of an image, the number of reproducible glossiness tones is limited to the number of dot arrangement types. According to the technique of Japanese Patent Laid-Open No. 2012-035603, the number of reproducible glossiness tones is limited to the number of scanning count types. Hence, according to these techniques, it is difficult to obtain a smooth glossiness change since the number of glossiness tones is small.

In contrast, according to the technique of Japanese Patent Laid-Open No. 2008-213271, the number of reproducible glossiness tones is determined by the use amount of a glossiness adjustment material, and smooth glossiness control is possible. However, a glossiness range (dynamic range) that is controllable by only the use amount of a glossiness adjustment material is not very wide. In this manner, it is difficult to obtain a smooth gradation reproduction of glossiness in a wide dynamic range by conventional glossiness control techniques.

SUMMARY OF THE INVENTION

According to one aspect of the present invention, an image processing apparatus comprises input means for inputting first data of an image to be formed, which includes a color and second data of the image to be formed, which does not include the color and has continuous gradation, first determination means for determining printing material amount data corresponding to the first data, second determination means for determining, based on the printing material amount data, a dot pattern when forming the image by performing a printing scan a plurality of times on a printing medium, and generation means for generating, based on the second data, a switching signal that switches each pixel in accordance with an area ratio of each of a first dot pattern and a second dot pattern determined by the second determination means.

The present invention allows smooth gradation reproduction in an image to be formed.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1A is a view for explaining the relationship between a surface shape and glossiness image clarity.

FIG. 1B is a view for explaining the relationship between a surface shape and glossiness image clarity.

FIG. 2 is a block view showing an example of the arrangement of an image processing apparatus according to the first embodiment.

FIG. 3 is a flowchart for explaining image forming data generation processing by the image processing apparatus.

FIG. 4 is a flowchart for explaining processing of a switching signal generating unit.

FIG. 5 is a view showing an example of the generation of a switching signal GC.

FIG. 6A is a view showing an example of a color separation table.

FIG. 6B is a view showing an example of a color separation table.

FIG. 7A is a view for explaining an example of a pass mask.

FIG. 7B is a view for explaining an example of a pass mask.

FIG. 8 is a table for explaining the relationship of a glossiness value and image processing.

FIG. 9 is a block diagram showing an example of the arrangement of an image processing apparatus according to the second embodiment.

FIG. 10 is a view showing an example of a glossiness reproduction range LUT.

FIG. 11 is a block diagram showing an example of the arrangement of an image processing apparatus according to the third embodiment.

FIG. 12A is a view showing an example of a glossiness reproduction range LUT.

FIG. 12B is a view showing an example of a reproduced color value LUT.

FIG. 13 is a flowchart for explaining processing of a switching signal generating unit according to the third embodiment.

FIG. 14 is a view for explaining a color glossiness space.

FIG. 15 is a block diagram showing an example of the arrangement of the image processing apparatus according to Modification 1.

FIG. 16 is a block diagram showing an example of the arrangement of the image processing apparatus according to Modification 2.

FIG. 17 is block diagram showing an example of the arrangement of an information processing apparatus.

DESCRIPTION OF THE PREFERRED EMBODIMENTS

An image processing apparatus and an image processing method according to an embodiment of the present invention will be described in detail below with reference to the accompanying drawings. Note that the embodiment is not intended to limit the present invention to the scope of the appended claims, and not all combinations of arrangements described in the embodiment are indispensable for the means to solve the problems according to the present invention.

---Glossiness Image Clarity---

An example in which color image data and glossiness image data will be used as pieces of input information of an image processing apparatus will be described below. Color image data is 3-channel color image data including 8-bit R, G, and B components. Glossiness image data is 1-channel monochrome image data including 8 bits, and the larger its value, the higher the glossiness.

Although a known glossiness image clarity value will be used as a glossiness value, the present invention is not limited to this definition of the glossiness value. When the glossiness image clarity value is large, the illuminated image is clear. On the contrary, when the glossiness image clarity value is small, it indicates that the illuminated image is unclear. Note that sizes and resolutions of the color image data and the glossiness image data are the same.

Glossiness image clarity is known to be highly related to the surface shape of a printed material. FIGS. 1A and 1B are views for explaining the relationship between a surface shape and glossiness image clarity. FIGS. 1A and 1B show how transmitted light from an illumination 1 is reflected on the surface of a printed material 2 and is perceived as glossiness by an observer 3. As shown in FIG. 1A, in the case of a printed material 2a having low surface roughness and a high degree of smoothness, the reflection direction of the illuminated image included in the printed material 2a is uniform. In contrast, as shown in FIG. 1B, in the case of a printed material 2b having large surface roughness and a low degree of smoothness, the reflection direction of the illuminated image included in the printed material 2b is non-uniform.

If the reflection direction of the illumination light becomes non-uniform, the clarity of the illuminated image decreases, and the glossiness image clarity is decreased. That is, the surface shape of the printed material can be made rough to decrease the glossiness image clarity, and the surface shape of the printed material can be made smooth to increase the glossiness image clarity. Hence, if a printing condition to form a smooth surface shape and a printing condition to form a rough surface shape are held and the printing conditions are switched for each area, it is possible to arbitrarily reproduce glossiness image clarity (to be described in detail below).

First Embodiment

---Apparatus Arrangement---

FIG. 2 is a block diagram showing an example of the arrangement of an image processing apparatus 12 according to the first embodiment. In FIG. 2, an input unit 101 stores color image data RGB, input from an information processing apparatus 11, which represents the color of each pixel of a printing target image in a color image buffer 102. The input unit 101 also stores glossiness image data Gl, input from the information processing apparatus 11, which represents the glossiness image clarity of each pixel of a printing target image in a glossiness image buffer 103.

Each of the color image data RGB and the glossiness image data Gl is data that has been created, edited, or processed by various applications operating in an information processing apparatus 11, which is a computer apparatus. The color image data RGB is, for example, sRGB data. The color image data RGB and the glossiness image data Gl can be obtained not only from the information processing apparatus 11, but may also be obtained from an image input device, storage medium such as a memory card, a website, or the like. In addition, as the input unit 101, a serial bus interface such as a USB or a network interface such as a wired or wireless LAN.

A switching signal generation unit 104 converts, for each predetermined area, a multi-value glossiness image data Gl into a binary switching signal GC. The switching signal GC is a signal that indicates an image processing condition. For example, '1' indicates high-glossiness image processing, and '0' indicates low-glossiness image processing.

A pixel as a minimum unit of glossiness image data Gl can be used as the predetermined area. However, since it is only necessary for the predetermined area to be capable of expressing an area coverage modulation of a plurality of areas at the time of the observation, a block area including a plurality of pixels may also be used as the predetermined area. In addition, although an example in which two kinds of image processing, that is, for high-glossiness and low-glossiness, are included in the image processing apparatus, will be described below, the present invention is not limited to this. If three or more kinds of image processing are included to reproduce a glossiness value of three or more levels of modulation, the number of bits of the switching signal GC can be correspondingly increased.

A printing material determination unit 105 converts, based on the switching signal GC, the color image data RGB into multiple value printing material amount data that indicate the amounts of respective colored printing materials (to be referred to as color materials hereafter) and the amount of a colorless and transparent printing material (to be referred to as a clear material hereafter) provided in the image forming apparatus 13. This conversion processing will be called "color separation processing". Note that the clear material can be slightly colored or turbid, and it is sufficient for the printing material to be substantially colorless and transparent.

A halftone processing unit 106 performs, based on the switching signal GC, pseudo-halftone reproduction on the printing material amount data output from printing material determination unit 105 and converts, for each printing material, the multiple value printing material amount data into, for example, a binary printing signal that indicates each on dot printing position. An on dot is a dot formed by application of a printing material. In addition, as the pseudo-halftone reproduction, processing such as dither processing or error diffusion processing can be used.

A pass-separation unit 107 performs, based on the switching signal GC, pass-separation processing to separate each printing signal output from the halftone processing unit 106 into printing scans (passes) based on the multi-pass printing method and generates the drive data of the printing elements of a printhead included in the image forming apparatus 13.

The drive data output by the pass-separation unit 107 is stored as image forming data in an output data buffer 108. The image forming data stored in the output data buffer 108 is synchronized with the image forming operation of the image forming apparatus 13 and output to the image forming apparatus 13 via an output unit 109. A dedicated interface or a general purpose interface such as a USB, eSATA, PCI, or PCIe (R) can be used as the output unit 109.

---Image Forming Apparatus and Information Processing Apparatus---

Although the details of the arrangement of the image forming apparatus 13 are omitted, the image forming apparatus 13 can move a printhead lengthwise and breadthwise relative to the printing medium and prints, on the printing medium, a binary image of each color material expressed by the image forming data. In addition, the image forming apparatus 13 adopts a multi-pass printing method of completing an image by scanning the printhead on the printing medium a plurality of times and a so-called bidirectional printing method of performing printing operations in both forward scanning and backward scanning of the printhead.

FIG. 17 is a block diagram showing an example of the arrangement of the information processing apparatus 11. A CPU 171 uses a RAM 173 as a work memory to execute an OS or various kinds of programs stored in a ROM 172 and a storage unit 179 and controls each unit (to be described later) via a system bus 178.

The storage unit 179 is, for example, an HDD, an SSD, a flash memory, or the like, connected to the system bus 178 via a SATA interface (I/F). A general purpose I/F 175 is a serial bus interface such as a USB and is connected to an input device 14 such as a mouse or a keyboard, the image forming apparatus 13, and a general purpose drive 17 for storage media.

The CPU 171 loads, from the storage unit 179 to the RAM 173, a program designated by a user via the input device 14 and executes the program to display a user interface on a monitor 16 connected to a video card (VC) 174. The user uses the user interface to select, to create, and to edit the color image data and the glossiness image data to be input to the image processing apparatus 12. Note that the color image data or the glossiness image data or data that becomes the basis of these types of image data is stored in the storage unit 179 or the storage media of the general purpose drive 17.

A network interface card (NIC) 177 is a network interface to connect the information processing apparatus 11 to a network such as a wired LAN or a wireless LAN. Programs executed by the information processing apparatus 11 and data that becomes the basis of image data such as the color image data or the glossiness image data can be stored in a server apparatus on the network.

The processing and functions of the image processing apparatus 12 can be implemented by a printer driver for the image forming apparatus 13 executed by the information processing apparatus 11. The image processing apparatus 12 can be incorporated as hardware in the image forming apparatus 13 as a matter of course.

---Image Processing---

FIG. 3 is a flowchart for explaining image forming data generation processing by the image processing apparatus 12. The input unit 101 inputs the color image data RGB and the glossiness image data Gl and stores data in the color image buffer 102 and the glossiness image buffer 103, respectively (step S301). The switching signal generation unit 104 performs pseudo-halftone reproduction on the glossiness image data Gl and generates, for example, a switching signal GC for each pixel (step S302).

The printing material determination unit 105 switches, for each pixel, the table used for color separation processing in accordance with the switching signal GC and converts the color image data RGB into printing material amount data.

That is, when GC='0', the printing material determination unit 105 performs color separation processing by referring to a low-glossiness color separation lookup table (to be referred to as low-glossiness LUT hereafter) 111 (step S303a). When GC='1', color separation processing is performed by referring to a high-glossiness color separation lookup table (to be referred to as high-glossiness LUT hereafter) 112 (step S303b).

In the case of the image forming apparatus 13 that includes cyan C, magenta M, yellow Y, and black K as dark color materials (dark printing materials), and light cyan Lc, light magenta Lm, and gray Gy as light color materials (light printing materials), and a clear material CL, the printing material amount data becomes CMYKLcLmGyCL. That is, the printing material amount data includes a total of eight planes.

The halftone processing unit 106 switches the dither matrix in accordance with the switching signal GC and performs pseudo-halftone processing on the printing material amount data. That is, when GC='0', the halftone processing unit 106 performs pseudo-halftone reproduction using a low-glossiness dither matrix (to be referred to as low-glossiness MTX hereafter) 113 (step S304a). When GC='1', pseudo-halftone reproduction is performed using a high-glossiness dither matrix (to be referred to as a high-glossiness MTX hereafter) 114 (step S304b).

The pass-separation unit 107 switches the masks for pass-separation processing (to be referred to as pass masks hereafter) in accordance with the switching signal GC and performs pass-separation processing on the printing signal. That is, when GC='0', the pass-separation unit 107 performs pseudo-halftone reproduction using a low-glossiness pass mask (to be referred to as a low-glossiness mask hereafter) 115 (step S305a). When GC='1', pseudo-halftone reproduction is performed using a high-glossiness pass mask (to be referred to as a high-glossiness mask) 116 (step S305b).

The output unit 109 outputs, to the image forming apparatus 13, image forming data stored in the output data buffer 108 in synchronization with the image forming operation of the image forming apparatus 13 (step S306). The image forming data is output for, for example, the entire image or each bandwidth of the printing scan. The processes of steps S302 to S305 are repetitively executed in pixel units.

•Switching Signal Generation Unit

The process (step S302) of the switching signal generation unit 104 will be described with reference to the flowchart of FIG. 4. The switching signal generation unit 104 converts a glossiness value V serving as the pixel value of the glossiness image data Gl into an area ratio Vt (step S401). The area ratio Vt represents a ratio that a high-glossiness value H of a formable glossiness will be selected by the image forming apparatus 13 and is calculated by:

$$Vt=(V-L)/(H-L);$$

$$\text{if } (Vt<0) Vt=0;$$

$$\text{if } (Vt>1) Vt=1; \quad (1)$$

where L represents a low-glossiness value formable by the image forming apparatus 13, and H represents the high-glossiness value formable by the image forming apparatus 13.

That is, letting 1 be the range of the low-glossiness value L and the high-glossiness value H, the glossiness value V is converted into the area ratio Vt (0≤Vt≤1) that represents the ratio with respect to the range. Next, the area ratio Vt is converted into data of the same format as the glossiness value V (for example, 8-bit data) by using a maximum value M (for example, 255) of the glossiness value V.

$$Vt = Vt \times M; \quad (2)$$

Next, the switching signal generation unit 104 compares the area ratio Vt of a pixel of interest and a threshold th of the cell of the threshold matrix corresponding to the pixel of interest (step S402). If the area ratio exceeds the threshold (Vt>th), a switching signal GC='1' is set to set the high-glossiness image processing to the pixel of interest (step S403). If the area ratio is equal to or less than the threshold (Vt≤th), a switching signal='0' is set to set the low-glossiness image processing to the pixel of interest (step S404).

Subsequently, the switching signal generation unit 104 determines whether the switching signal GC has been generated for every pixel (step S405). If there is a pixel in which the switching signal GC has not been generated, the process is returned to step S401, and the processes from steps S401 to S404 are repeated until the switching signal GC of every pixel is generated.

The switching signal generation unit 104 uses, for example, a blue noise characteristic dither matrix as the threshold matrix. To prevent the occurrence of interference between the plurality of pseudo-halftone reproduction processes, it is preferable that the threshold matrix used by the switching signal generation unit 104 and the dither matrix used by the halftone processing unit 106 are different in at least one of a different threshold, screen angle, and number of screen lines. The switching signal generation unit 104 may use a dither matrix other than that of the blue noise characteristic as a matter of course. Alternatively, in place of the threshold matrix, the switching signal generation unit 104 can generate the switching signal GC by error diffusion processing which uses an error diffusion matrix different from that used by the halftone processing unit 106.

FIG. 5 shows an example of the generation of the switching signal GC. To conveniently describe a case in which the area ratio Vt is 4 bits, an example in which the threshold matrix is formed by 4×4 cells is shown in FIG. 5. FIG. 5 shows, from the left, the area ratios Vt of 4×4 pixels, a 4×4 cell threshold matrix, and the switching signals GC of 4×4 pixels. As shown in FIG. 5, even if the area ratio Vt is the same value, each switching signal GC changes depending on the pixel position. That is, it is possible to control the glossiness of an image which is formed based on the average of the glossiness values V of a plurality of pixels. In addition, since the glossiness of the image to be formed is controlled by the ratio (area ratio Vt) of the areas formed by the high-glossiness value H, linear glossiness control becomes possible.

Note, that as the threshold matrix to be used to generate the switching signals GC, a dot-converged type matrix such as grid of dots or an AM screen may be used. Particularly, when a certain area is required for glossiness control, the dot-converged type matrix is preferable.

•Printing Material Amount Determination Unit

The printing material determination unit 105 includes, as color separation tables, the low-glossiness LUT 111 and the high-glossiness LUT 112. FIGS. 6A and 6B show examples of respective color separation tables. For the same color image data RGB, the printing material amount data obtained by color separation processing using the low-glossiness LUT 111 shown in FIG. 6A and the printing material amount data obtained by color separation processing using the high-glossiness LUT 112 shown in FIG. 6B are different.

In a printer that uses pigment ink, when many dark color materials such as C, M, and K that have a larger color material content than the light color materials such as Lc, Lm, and Gy are used, the surface shape of the printed material has a tendency to become rough. In contrast, if many light color materials are used, the surface shape of the printed material has a tendency to become smooth. Hence, the low-glossiness LUT 111 has a conversion characteristic which uses relatively many dark colors, and the high-glossiness LUT 112 has a conversion characteristic which uses relatively many light colors.

By using the low-glossiness LUT 111 and the high-glossiness LUT 112 set with respective conversion characteristics so that the difference of glossiness image clarity reproduction values depending on the printing materials is maximized, the reproducible area of glossiness image clarity with respect to the glossiness image data Gl can be maximized. In addition, if the color image data RGB indicates white (255, 255, 255) during the low-glossiness color separation processing, the surface shape of the printed material is controlled by using the clear material CL.

•Halftone Processing Unit

The halftone processing unit 106 includes, as dither matrices, the low-glossiness MTX 113 and the high-glossiness MTX 114. For the same printing material amount data, different printing signals are obtained from the pseudo-halftone reproduction performed by the low-glossiness MTX 113 and the pseudo-halftone reproduction performed the high-glossiness MTX 114.

In a printer that uses pigment ink, connection of dots that have ink droplet landing positions which are apart from each other and connection of dots that have a large difference in ink droplet landing timings rarely occur, and there is a tendency for the surface shape of the printed material to become rough. On the other hand, connection of dots that have close landing positions and connection of dots that have a small landing timing difference easily occur.

Hence, a dot-dispersed-type blue-noise-characteristic dither matrix in which landing positions are dispersed is used as the low-glossiness MTX 113, and a dot-converged-type blue-noise-characteristic dither matrix in which the landing positions are concentrated in a small area is used as the high-glossiness MTX 114.

•Pass-Separation Unit

The pass-separation unit 107 includes, as pass masks, the low-glossiness mask 115 and the high-glossiness mask 116. FIGS. 7A and 7B are views for explaining the examples of respective pass masks. FIGS. 7A and 7B each schematically show a printhead and a printing pattern. FIG. 7A corresponds to a printing pattern by the low-glossiness mask 115, and FIG. 7B corresponds to a printing pattern by the high-glossiness mask 116.

For the sake of descriptive convenience, a printhead 201 is provided with sixteen nozzles in FIGS. 7A and 7B. The nozzles are divided by the number of printing scans. For example, if four printing scans are to be performed, the nozzles are divided into first to fourth nozzle groups as shown in each of the FIGS. 7A and 7B.

In FIG. 7A, a printing pattern (mask pattern) 202 shows the unit area where the nozzles perform printing. The patterns printed by the respective nozzle groups are in a complementary relationship with each other. When the patterns printed by the respective nozzle groups are overlaid, printing of the unit area corresponding to the 4×4 pixels is completed. That is, as shown by patterns 203 to 206, an image is completed by repetitively layering the printing scans.

The printing medium is conveyed an amount equivalent to the width of each nozzle group in the direction of an arrow shown in FIG. 7A each time a printing scan ends. Hence, an image in a same area of the printing medium (the area corresponding to each nozzle group width) is completed by four printing operations.

Since the mask pattern 202 of the low-glossiness mask 115 shown in FIG. 7A has a small number (4 dots/pass) of printing dots for each printing scan, the landing timing difference of adjacent dots is large, and dot connection rarely occurs. In contrast, in a mask pattern 212 of the high-glossiness mask 116 shown in FIG. 7B, eight dots are formed in the first pass, the remaining eight dots are formed in the second pass, and no dots are formed in the third and fourth passes. Hence, the landing timing difference of adjacent dots is small, and it becomes easy for dot connection to occur.

In other words, the pass-separation unit 107 uses, when the switching signal GC indicates the low-glossiness image processing, the low-glossiness mask 115 by which the printing of dots is dispersed over a plurality of printing scans of the image forming apparatus 13. When the switching signal GC indicates the high-glossiness image processing, the high-glossiness mask 116 which prints all of the dots in some (the first and second passes in the example of FIG. 7B) of the plurality of printing scans of the image forming apparatus 13 is used.

In this manner, the pass-separation unit 107 switches the two pass masks based on the switching signal GC, determines the dot printing positions according to the printing signal, and generates drive data. By using the low-glossiness mask 115 and the high-glossiness mask 116 that maximizes the difference of glossiness image clarity reproduction values depending on the printing of dots, the reproducible area of glossiness image clarity with respect to the glossiness image data Gl is maximized.

•Image Forming Apparatus

The image forming apparatus 13 can perform, by using a plurality of printing elements, a plurality of printing scans on the same area of the printing medium using the same or different printing materials. When the switching signal GC indicates the low-glossiness image processing, dots of the clear material CL are printed first, and "pre-printed clear material+dot overlay control" in which dots of a color material is overlaid on dots of the clear material CL becomes possible from the image processing of the image processing apparatus 12. Hence, it becomes possible to make the surface shape of the printed material rough.

When the switching signal GC indicates the high-glossiness image processing, dot overlay is not performed, and by clear material filling which prints dots of the clear material CL at positions where dots of the color material are not printed by the image processing of the image processing apparatus 12, it becomes possible to make the surface shape of the printed material smooth.

Furthermore, by the image processing of the image processing apparatus 12, it is possible to perform, on the white area of the printed material to which the switching signal GC indicates the low-glossiness image processing, "pre-printed clear material+dot overlay control" in which dots of a color material are overlaid on the dots of the clear material after the dots of the clear material have been printed. Hence, it becomes possible to make the surface shape of the printed material rough.

The image processing apparatus 12 holds image processing conditions (color separation tables, dither matrices, and pass masks), which maximize the difference of glossiness image clarity reproduction values, and switches between the high-glossiness image processing and the low-glossiness image processing for each pixel by the area ratio based on the glossiness value of the glossiness image data Gl.

FIG. 8 is a view for explaining the relationship between the glossiness value and image processing. That is, in an area that has a low glossiness value, the surface shape of the printed material is made rough by using many dark ink materials, performing the dot-dispersed type halftone processing, using a pass mask that has a large landing timing difference, and performing pre-printed clear material+dot overlay control. In contrast, in an area that has a high glossiness value, the surface shape of the printed material is made smooth by using many light color ink materials, performing the dot-converged type halftone processing, using a pass mask which has a small landing timing difference, and by performing clear material filling.

In this manner, by performing halftone processing on the glossiness image data Gl, multiple image processing conditions need not be held, and it is possible to reproduce the glossiness value indicated by the glossiness image data Gl by using two kinds of image processing conditions for each type of image processing. In addition, since glossiness image clarity is controlled, not only by the printing material amount, but also by control including the printing number of dots and arrangement for each printing scan, a wide controllable glossiness range (dynamic range) can be set.

In the above description, an example in which image processing is switched upon performing generation of the switching signal GC (step S302) before the color separation processing (step S303) has been described. However, the drive data can be selected based on the glossiness value V of the glossiness image data Gl after the generation of low-glossiness drive data and high-glossiness drive data.

In the above description, an example in which two tables, that is, for low-glossiness and for high-glossiness, are included as color separation tables has been described. However, a single color separation table to which the color image data RGB and the glossiness image data Gl are input may be used. According to such a table, the referred table area changes in accordance with the glossiness image data Gl, and the same output as that obtained in the case where two tables are switched can be obtained. In this case, the pseudo-halftone reproduction (step S304) and the pass-separation processing (step S305) are switched in accordance with the switching signal GC, as a matter of course.

In the above description, an example in which the pseudo-halftone reproduction (step S304) and the pass-separation processing (step S305) are switched has been described. However, the present invention is not limited to this. The pass-separation processing may be kept unchanged and only the pseudo-halftone reproduction may be switched. Alternatively, the pseudo-halftone reproduction may be kept unchanged and only the pass-separation processing may be switched.

In the above description, an example in which processing of pass-separation unit 107 has been performed subsequently to the processing of the halftone processing unit 106 has been described. However, it is sufficient as long as the dot printing positions corresponding to the printing material amount data can be determined. For example, the printing material amount data can be divided to perform halftone processing for each printing scan, and the halftone processing unit 106 and the pass-separation unit 107 can be formed as a single processing unit.

In the above description, as the image processing conditions for reproducing different glossiness, a description was made using examples of color separation tables having different use ratios of dark color materials and light color materials, dither matrices having different frequency characteristics, and pass masks having different number of printing dots for each printing scan. However, the image processing condition is sufficient as long as it is an image processing condition that can control the roughness and smoothness of the surface shape of the printed material in which glossiness is to be reproduced. For example, it is possible to perform processing in which an image is overcoated with a clear material to control the surface shape after the image has been formed by color materials. In this case, a color separation table and a pass mask to implement a clear material overcoat can be prepared only when the low-glossiness image processing is to be performed.

In the above-description, an example in which glossiness image data Gl is input from the outside has been described. However, the present invention is not limited to the above-described method of obtaining glossiness image data Gl. For example, an arbitrary method such as generating glossiness image data Gl from a luminance distribution or a histogram of color image data can be used.

In the above description, an example in which the glossiness value V of the glossiness image data Gl is converted into the area ratio Vt has been shown. However, the glossiness image data Gl can be, for example, binary data that indicates an imaging condition. In this case, the processing to convert glossiness value V into the area ratio Vt can be omitted, and the image processing can be switched based on the glossiness image data Gl.

In the above description, if two image processing conditions coexist, under the premise that the characteristic indicated by the glossiness image data Gl linearly changes (monotonically changes in accordance with the area ratio Vt), gamma correction is not performed on the glossiness image data Gl. For example, under the two image processing conditions, a test chart obtained by changing the area ratio Vt is formed, a characteristic between the area ratio Vt and the glossiness image quality is obtained, and the gamma correction to make the characteristic linear can be performed on the glossiness image data Gl. Alternatively, instead of making the characteristic linear, gamma correction to make the characteristic non-linear can be performed so that the data will become closer to a sensory amount.

In the above description, an example in which the area ratio Vt is clipped when the glossiness image data Gl is outside the formable range of low-glossiness value L and high-glossiness value H has been shown. In this case, for example, a warning can be displayed on the monitor of the image processing apparatus 12, and the user may determine whether to continue or cancel the printing.

In the above description, an example in which two image processing conditions are provided to maximize the difference of glossiness image quality reproduction values has been described. However, as long as there is a difference in the reproduction values, the value between these two values can be reproduced. In other words, even when two image processing conditions that cannot maximize the difference in the glossiness image quality reproduction values are provided, an area ratio Vt that is outside their reproduction range can be clipped to generate the switching signal GC.

In the above description, an example in which two image processing conditions (color separation tables, dither matrices, and pass masks) corresponding to a binary switching signal GC are provided has been described. However, a ternary switching signal can be used and three image processing conditions may be provided.

The present invention is not limited to one printhead, but can be applied to a printing method that uses a plurality of printheads. Furthermore, the arrangement of the printhead is arbitrary, and arbitrary arrangements can be adopted for the number of nozzles, the number of printing materials, and types of printing materials. For example, a full multihead longer than the width of the printing medium may be used. Arbitrary printing materials such as spot color materials such as red and green, white printing materials, metallic materials, pearl materials, and the like, can be used. Pigment ink, dye ink, latex ink, solvent ink, fluorescent ink, ultraviolet curing ink, and the like, can also be selected arbitrarily.

Second Embodiment

An image processing apparatus and an image processing method according to the second embodiment of the present invention will be described below. Note that in the second embodiment, the same reference numerals as those in the first embodiment denote the same components and a detailed description thereof may be omitted.

The method in which input glossiness image data Gl is directly used was described in the first embodiment. In general, since the glossiness characteristic changes for each color in a pigment inkjet method printer, even if the pixel values of the glossiness image data are the same, the reproduced glossiness may vary when the pixel values of the color image data RGB vary.

In other words, although it is easy to control the glossiness characteristic in a single color image, it may be difficult to strictly control the glossiness characteristic in an image formed by a plurality of colors. In the second embodiment, the glossiness characteristic in an image formed by a plurality of colors is controlled by holding the glossiness image clarity reproduction range (to be referred to as the glossiness reproduction range hereafter) for each color and converting input glossiness image data Gl into an area ratio Vt of the glossiness reproduction range area for each color.

FIG. 9 is a block diagram showing an example of the arrangement of an image processing apparatus 12 according to the second embodiment. A switching signal generation unit 104 according to the second embodiment holds a table (to be referred to as the glossiness reproduction range LUT hereafter) 121 in which the glossiness reproduction range is stored. FIG. 10 shows an example of the glossiness reproduction range LUT 121.

The glossiness reproduction range LUT 121 is a table that shows a low-glossiness value L and a high-glossiness value H for each combination of RGB values. The low-glossiness value L is a glossiness value that is reproducible for the minimum glossiness image data Gl=0 and is a glossiness value obtained when an image forming operation is performed by low-glossiness image processing. The high-glossiness value H is a glossiness value that is reproducible for the maximum glossiness image data Gl=255, is a glossiness value obtained when an image forming operation is performed by high-glossiness image processing, and is measurable in advance by creating a test chart by the image forming apparatus 13.

Note that the glossiness reproduction range LUT 121 need not hold a low-glossiness value L and a high-glossiness value H for each combination of RGB values and holds, for example, the low-glossiness values L and the high-glossiness values H that correspond to respective $17^3=4913$ matrix points obtained by dividing the RGB values into sixteen increments. To obtain the low-glossiness values L and the high-glossiness values H that correspond to the respective combinations of RGB values between the matrix points, an arbitrary interpolation method such as tetrahedron interpolation, or the like.

The switching signal generation unit 104 inputs color image data RGB and obtains, as the low-glossiness value L and the high-glossiness value H of the process in step S401, the glossiness values corresponding to the color image data RGB by referring to the glossiness reproduction range LUT 121. Then, a switching signal GC corresponding to the input glossiness image data Gl is generated.

Letting L(RGB) be the low-glossiness value and H(RGB) be the high-glossiness value obtained for the color image data RGB, the switching signal generation unit 104 calculates the area ratio Vt (step S401) by:

$$Vt=\{V-L(RGB)\}/\{H(RGB)-L(RGB)\};$$

if $(Vt<0) Vt=0;$ if $(Vt>1) Vt=1;$ $$Vt=Vt \times M; \quad (3)$$

where V represents a pixel value of the glossiness image data Gl, and M represents the maximum value (for example, 255) of the glossiness value V.

Next, the switching signal generation unit 104 compares, in the same manner as the processing in the first embodiment shown in FIG. 4, the area ratio Vt of a pixel of interest and a threshold th of a threshold matrix cell which corresponds to the pixel of interest (step S402). If the area ratio exceeds the threshold (Vt>th), the switching signal GC='1' is set to set the high-glossiness image processing to the pixel of interest (step S403). If the area ratio is equal to or less than (Vt≤th), the switching signal='0' is set to set the low-glossiness image processing to the pixel of interest (step S404).

Next, the switching signal generation unit 104 determines whether the switching signal GC has been generated for every pixel (step S405). If there is a pixel in which the switching signal GC has not been generated, the process is returned to step S401, and the processes of steps S401 to S404 are repeated until the switching signal GC is generated for every pixel.

In this manner, the glossiness reproduction range that corresponds to the color to be reproduced is held, and the glossiness value V of the glossiness image data Gl is converted into the area ratio Vt in accordance with the glossiness reproduction range. As a result, even in an image formed by a plurality of colors, the glossiness value can be stably reproduced, and smooth gradation reproduction of glossiness is possible.

The obtainment method of the glossiness reproduction range for each color is not limited to the above description, and the user may input the glossiness reproduction range that corresponds to the RGB values. Furthermore, a correction unit which corrects the user designated color by the glossiness reproduction range LUT 121 having high glossiness reproduction control accuracy by forming a test chart obtained from changing the glossiness image data Gl for the user designated color and measuring the glossiness image clarity can be included.

Third Embodiment

An image processing apparatus and an image processing method according to the third embodiment of the present invention will be described below. Note that in the third embodiment, the same reference numerals as those in the first and second embodiments denote the same components and a detailed description thereof may be omitted.

The first and second embodiments have described an example in which the low-glossiness LUT 111 and the high-glossiness LUT 112 hold respective printing material amount values to reproduce almost the same color with respect to the same RGB values. However, depending on the processing of the image forming apparatus 13, the color reproduction range may be largely different between a case in which the glossiness value is maximized and a case in which the glossiness value is minimized. For example, in the case of low glossiness, the color reproduction range can become wide since many dark color materials are used, and in the case of high glossiness, the color reproduction range can become narrow since many light color materials are used.

In other words, if color separation LUTs are designed so as to reproduce almost the same color by low glossiness and high glossiness for the same RGB values, the color design will conform to the color reproducibility of high glossiness that has a narrow color reproduction range. As a result, it becomes difficult to use the reproducible color reproduction range in low glossiness.

In the third embodiment, a table (to be referred to as the reproduction color value LUT hereafter) storing color values reproducible by an image forming apparatus 13 with respect to the RGB values of the input color image data is used. In addition, a table (to be referred to as the glossiness reproduction range LUT hereafter) that stores the low-glossiness values reproducible by the image forming apparatus 13 for respective predetermined color values by low-glossiness image processing and the high-glossiness values reproducible by the image forming apparatus 13 for the respective predetermined color values by high-glossiness image processing is held.

In the third embodiment, the color reproduction range for when a color value corresponding to color image data RGB is to be reproduced is calculated by referring to these tables, and glossiness image data Gl is converted into the area ratio of the glossiness reproduction range. As a result, gradation reproduction having a smooth glossiness becomes possible in a wider color reproduction range.

FIG. 11 is a block diagram showing an example of the arrangement of an image processing apparatus 12 according to the third embodiment. A switching signal generation unit 104 according to the third embodiment holds a glossiness reproduction range LUT 122 and a reproduction color value LUT 123. FIGS. 12A and 12B show the glossiness reproduction range LUT 122 and the reproduction color value LUT 123, respectively.

The reproduction color value LUT 123 shown in FIG. 12B holds the relationship between RGB values (input signal values) of the color image data and the output color values (Lab values) reproducible by the image forming apparatus 13. The glossiness reproduction range LUT 122 shown in FIG. 12A holds a low-glossiness value Lc, high-glossiness value Hc, and the color values (Lab values) when the same RGB values have undergone image formation by the respective low-glossiness and high-glossiness image processing conditions.

Note that the reproduction color value LUT 123 need not hold color values for every combination of RGB values and holds dispersed color values corresponding to, for example, respective 17³=4913 matrix points obtained by dividing the RGB values into sixteen increments. An arbitrary interpolation method such as tetrahedron interpolation or the like can be used to obtain color values for the RGB values between the matrix points. Similarly in the case of the glossiness reproduction range LUT 122, an arbitrary interpolation method such as tetrahedron interpolation, or the like, can be used to obtain glossiness values with respect to Lab values between matrix points.

FIG. 13 is a flowchart for explaining processing of the switching signal generation unit 104 according to the third embodiment. The switching signal generation unit 104 inputs the color image data RGB of a pixel of interest (step S1301) and obtains the color values corresponding to the color image data RGB by referring to the reproduction color value LUT 123 (step S1302). Next, the glossiness image data Gl of the pixel of interest is input (step S1303), and the low-glossiness value L and the high-glossiness value H corresponding to the glossiness value V and the color values of the pixel of interest are obtained based on the glossiness reproduction range LUT 122 (step S1304). Subsequently, the glossiness value V is converted into the area ratio Vt based on the low-glossiness value L and the high-glossiness value H (step S1305).

FIG. 14 is a view for explaining a color glossiness space and is a schematic view in which a brightness value L* is omitted and the reproduction range of color and glossiness is expressed by the glossiness value and pieces of color information a* and b*. The combination of color values and glossiness is called "color glossiness value" hereinafter. The brightness value L* in FIG. 14 has been omitted due to descriptive convenience, and the actual processing is processing performed in a color glossiness space which is a four-dimensional space that uses the brightness value L*.

In FIG. 14, a curved plane 1401 expresses the color glossiness reproduction range by low-glossiness image processing, and a curved plane 1402 expresses the color glossiness reproduction range by high-glossiness image processing. In other words, the curved planes 1401 and 1402 are reproduction ranges of the color glossiness values expressed by the glossiness reproduction range LUT 122. The curved plane 1401 and the curved plane 1402 are called "low-glossiness color gamut" and "high-glossiness color gamut", respectively, hereafter. As shown in FIG. 14, the low-glossiness color gamut and the high-glossiness color gamut have different color reproduction ranges and glossiness reproduction ranges from each other.

The color glossiness value obtained in steps S1302 and S1303 is expressed as a point in the color glossiness space shown in FIG. 14. The switching signal generation unit 104 searches for a matrix point of the glossiness reproduction range LUT 122, which is close to the obtained color glossiness value. Note that, when the high-glossiness color gamut 1402 is projected on the low-glossiness color gamut 1401, the area where both overlap will be called "common area".

•Case in which Color Glossiness Value is in Common Area

If the color glossiness value is present in the common area in the manner of a point 1403, an intersection point 1404 of the low-glossiness color gamut 1401 and a straight line extending in parallel to the glossiness axis from the point 1403 and an intersection point 1405 of the high-glossiness color gamut 1402 and the straight line will have the same chromaticity (pieces of color information a* and b* have the same value) as the point 1403. The glossiness values of the respective points 1404 and 1405 are calculated by an interpolation operation that refers to the glossiness values of the surrounding matrix points. Then, letting L be the glossiness value of the point 1404, and letting H be the glossiness value of the point 1405, the glossiness value V of the point 1403 is converted into the area ratio Vt by equations (1) and (2) in the same manner as in the first embodiment.

•Case in which Color Glossiness Value is Outside Common Area

In contrast, if the color glossiness value is outside of the common area in the manner of a point 1406, although an intersection point 1407 of the low-glossiness color gamut 1401 and a straight line extending in parallel to the glossiness axis from the point 1406 is present, there is no intersection point of the high-glossiness color gamut 1402 and the straight line. In other words, there is no color value reproducible point on the high-glossiness color gamut 1402. In this case, combinations of matrix points each pair of which interposes the point 1406 are searched out of all the combinations of matrix points held by the glossiness reproduction range LUT 122. If a combination is present, the high-glossiness value H and the low-glossiness value L that reproduce the same chromaticity as the point 1406 are calculated by using the interpolation method in a four-dimensional space.

FIG. 14 shows an example in which matrix points 1401a to 1401d of the low-glossiness color gamut 1401 each pair of which interposes the point 1406 and matrix points 1402a to 1402d of the high-glossiness color gamut 1402 are searched. An example in which the low-glossiness value L is obtained from the four points of matrix points 1401a to 1401d and the high-glossiness value H is obtained from the eight points of matrix points 1401a to 1401d and 1402a to 1402d. Letting H be the highest glossiness value out of the calculated glossiness values, and letting L be the lowest glossiness value out of calculated glossiness values, the glossiness value V of the point 1406 is converted into the area ratio Vt by equations (1) and (2) in the same manner as in the first embodiment.

If there is no combination of matrix points that interposes the point 1406, the point 1406 is mapped on a common area where the color glossiness value difference is minimized, the glossiness values H and L are obtained, and the glossiness value V is converted into the area ratio Vt. The subsequent processes are the same as those in the first embodiment. The same reference numerals denote the same processes and components and a description thereof is omitted. Note that the color glossiness difference is the total of the color value difference and the glossiness value difference.

In addition, printing material amount data (output value) is stored in the low-glossiness LUT 111 and the high-glossiness LUT 112 of the third embodiment when the color glossiness value is the input value. A printing material determination unit 105 executes color separation processing based on the color glossiness value input from the switching signal generation unit 104.

In this manner, even in a case in which the color reproduction range greatly differs depending on the glossiness, gradation reproduction having a smooth glossiness can be obtained while effectively using the color reproduction range. Note that, although an example in which Lab values are used for color has been described, the color space to express color is arbitrary.

In the above description, an example in which the color reproduction range is wide in low glossiness and the color reproduction range is narrow in high glossiness has been described. However, the third embodiment is also applicable when a dot pattern that increases the overlap ratio of dots to reproduce low glossiness is used, since it is also a case in which the low-glossiness reproduction range becomes narrower than in high glossiness.

Although an example in which mapping processing is performed on the common area where the color glossiness value difference is minimized when the color glossiness value cannot be interposed depending on the combination matrix points has been described, the mapping method is not limited to this. For example, a mapping method of minimizing the glossiness value difference, a mapping method of minimizing the color value difference, or a method of mapping the border of the common area can be selected in accordance with the degree of priority designated by the user.

MODIFICATIONS

In the first to third embodiments, examples in which the color image data and the glossiness image data were input have been described. If a physical amount, for example, such as distance information that is difficult to reproduce as a printed material is input instead of the glossiness image data, image processing can be performed by replacing the information to glossiness information which is reproducible on the printed material.

Modifications applicable to the present invention will be described below. Note that, in the modifications, the same reference numerals as those in the first to third embodiments denote the same components and a detailed description thereof may be omitted.

•Modification 1

Examples in which the color image data and the glossiness image data are input have been described in the first to third embodiments. However, the input data can be the color image data and data that has a physical amount for expressing the target object, which is partially different from the color image data and has tonal expression (has a continuous gradation). In this case, the color image data becomes the first data, the data expressing the continuous gradation of the physical amount different from the color expressed by the first data becomes the second data. In the first to third embodiments, the color image data was the first data and the glossiness image data was the second data. In Modification 1, an example in which a combination of color image data and sharpness image data expressing sharpness is input to perform multiple tone control of the sharpness of the output image will be described.

Sharpness increases when the luminance difference or the density difference between adjacent pixels is large. Hence, in Modification 1, an arbitrary sharpness is reproduced by holding an image processing condition by which the density difference between the adjacent pixels is easily maintained and an image processing condition by which the density difference between the adjacent pixels is difficult to maintain, and switching the image processing conditions for each pixel.

FIG. 15 is a block diagram showing an example of the arrangement of the image processing apparatus according to Modification 1. The input unit 101 of the image processing apparatus 12 according to Modification 1 inputs only the color image data RGB and includes a sharpness image generating unit 130 in place of the glossiness image buffer 103 of the first embodiment. Note that the sharpness image data generated in the information processing apparatus 11 may be input to the input unit 101.

The sharpness image generating unit 130 generates sharpness image data based on the color image data stored in the color image buffer 102. The generation method of the sharpness image data uses a method of calculating the pixel value difference between adjacent pixels in the color image data. The value of the sharpness image data becomes large at a pixel position where the pixel value difference between adjacent pixels is large, high sharpness is expressed, and sharpness image data is set as an 8-bit data of 0 (not sharp) to 255 (sharp).

The switching signal generation unit 104 converts a sharpness which is a pixel value of the sharpness image data into the area ratio Vt. The area ratio Vt indicates the ratio at which high-sharpness value $S_H$ formable by the image forming apparatus 13 is selected and is calculated by:

$$Vt=(S-S_L)/(S_H-S_L);$$

$$\text{if } (Vt<0) Vt=0;$$

$$\text{if } (Vt>1) Vt=1;$$

$$Vt=Vt \times M; \qquad (4)$$

where $S_L$ represents a formable low-sharpness value, $S_H$ represents a formable high-sharpness value, and M represents the maximum value (for example, 255) of the sharpness value S.

Next, the switching signal generation unit 104 compares the area ratio Vt of the pixel of interest and the cell threshold th of the threshold matrix corresponding to the pixel of interest. If the area ratio exceeds the threshold (Vt>th), the switching signal GC='1' is set to set high-sharpness image processing (maximum value image processing) for the pixel of interest. In addition, if the area ratio is equal to or less than the threshold (Vt≤th), the switching signal GC='0' is set to set low-sharpness image processing (minimum value image processing) for the pixel of interest. The above-described generation processing of the switching signal GC is performed for all of the pixels in the same manner as in the first embodiment.

The image processing apparatus 12 of Modification 1 includes, in place of the low-glossiness LUT 111 and the high-glossiness LUT 112, a low-sharpness LUT 131 and a high-sharpness LUT 132. In the same manner, in place of the low-glossiness MTX 113 and the high-glossiness MTX 114, a low-sharpness MTX 133 and a high-sharpness MTX 134 are included. In place of the low-glossiness mask 115 and the high-glossiness mask 116, a low-sharpness mask 135 and a high-sharpness mask 136 are included.

In a printer that uses pigment ink, when many light color materials are used compared to dark color materials, the density difference between the adjacent pixels is decreased, and sharpness tends to fall. Hence, each output value is set so that the low-sharpness LUT 131 uses relatively many light color materials and the high-sharpness LUT 132 uses relatively many dark colors.

In a printer that uses pigment ink, connection of dots that have ink droplet landing positions that are near to each other and connection of dots that have a small difference in ink droplet landing timings can easily occur. When dots having different colors or gradations are connected, the color between these dots or change of gradation becomes dull, and the sharpness degrades. Hence, the dot-dispersed type blue-noise characteristic dither matrix in which landing positions are dispersed is used as the low-sharpness MTX 133, and the dot-converged type green-noise characteristic in which landing positions are converged in a small area is used as the high-sharpness MTX 134.

When bidirectional printing is performed in a multi-pass printing method printer using pigment ink, compared to one directional printing, shifts in ink landing positions occur in forward scanning and backward scanning, and the sharpness is degraded. Hence, the pass mask for bidirectional printing is used as the low-sharpness mask 135 and the pass mask for one directional printing is used as the high-sharpness mask 136.

In this manner, based on the sharpness image data generated from the color image data, smooth reproduction of sharpness change can be obtained.

In the above description, an example in which the sharpness image data is used in place of the glossiness image data has been described. However, the type of data is not limited. For example, it may be data that expresses internal confusion, roughness, or distance. Additionally, color image data is not essential, and three or more types of data may be input. The nature of the present invention lies in reproducing, when the reproduction value of a given characteristic value (glossiness value or the like) is defined by two or more different types of printing methods, the reproduction value of the characteristic value by multiple tones by two or more different types of image processing conditions, and the present invention is applicable to an arbitrary characteristic value.

•Modification 2

The first to third embodiments and Modification 1 each has explained an example of a printer that performs image formation by using pigment ink as the printing material. However, the image forming apparatus to which the present invention is applicable is not limited to this. For example, it may be a printer that uses ultraviolet curing ink (to be referred to as UV curing ink hereafter). Modification 2 describes an image forming apparatus that reproduces the roughness of the printed material by using UV curing ink.

FIG. 16 is a block diagram showing an example of the arrangement of the image forming apparatus according to Modification 2. The input unit 101 of the image processing apparatus 12 according to Modification 2 inputs the color image data RGB and roughness data and includes a roughness data buffer 140 in place of the glossiness image buffer 103 of the first embodiment.

The roughness data is an 8-bit image data of 0 (smooth) to 255 (rough) based on the surface roughness within a predetermined area. The image forming apparatus 13 includes, other than the aforementioned color materials, the UV curing ink as the printing material to form roughness. The UV curing ink is, for example, a substantially colorless and transparent printing material which includes ultraviolet curing resin. A roughness layer is printed on the printing medium using the UV curing ink, and an image is formed on the roughness layer (the image surface) by the color materials. Note that the UV curing ink may be slightly colored or turbid.

The switching signal generation unit 104 converts a surface roughness A that is the pixel value of the roughness data into the area ratio Vt. The area ratio Vt indicates the ratio in which the maximum value $A_H$ of surface roughness formable by the image forming apparatus 13 is selected and is calculated by the following equation. Note that, the lowest value $A_H$ of formable surface roughness is 0.

$Vt=A/A_H;$ if $(Vt<0)Vt=0;$ if $(Vt>1)Vt=1;$ $Vt=Vt\times M;$ (5)

where M represents the maximum value (for example, 255) of height A.

Next the switching signal generation unit 104 compares the area ratio Vt of the pixel of interest and the cell threshold th of the threshold matrix corresponding to the pixel of interest. If the area ratio exceeds the threshold (Vt>th), the switching signal GC='1' is set to set rough surface image processing (maximum value image processing) for the pixel of interest so that the surface roughness is maximized. In addition, if the area ratio is equal to or less than the threshold (Vt≤th), the switching signal GC='0' is set to set smooth surface image processing (minimum value image processing) for the pixel of interest so that the surface roughness is minimized. The above-described generation processing of the switching signal GC is performed for all of the pixels in the same manner as in the first embodiment.

The image processing apparatus 12 of Modification 2 includes, in place of the low-glossiness LUT 111 and the high-glossiness LUT 112, a rough-surface LUT 141 that outputs UV-curing-ink material amount data UV (for example, UV=255) for color processing and a smooth-surface LUT 142 that constantly outputs material amount data UV=0. In the same manner, in place of the low-glossiness MTX 113 and the high-glossiness MTX 114, a rough-surface MTX 143 and a smooth-surface MTX 144 are included, and a pass mask 145 is included in place of the low-glossiness mask 115 and the high-glossiness mask 116.

The pass-separation unit 107 which refers to the pass mask 145 generates, for example in the first pass, if the switching signal GC indicates the rough surface image processing, drive data to print the UV curing ink on target areas in accordance with the UV curing ink printing signal. For example, drive data to print the UV curing ink so that the area will be a checkered pattern of an area ratio of 50% is generated. In addition, if the switching signal GC indicates the smooth surface image processing, UV curing ink drive data is not generated regardless of the UV curing ink printing signal. Accordingly, in the area where rough surface image processing is indicated by the switching signal GC, areas printed with UV curing ink and areas not printed with UV curing ink coexist, thereby forming roughness on the printing medium. In each remaining pass, the pass-separation unit 107 generates drive data in accordance with the color material printing signal.

Note that, although in the above description, an example of forming roughness on the printing medium based on whether to perform UV curing ink printing has been described, the present invention is not limited to the example of the above description. As described in the first embodiment, the dither matrices and the pass masks may be switched, and the roughness may be formed by color materials in addition to the above-described UV curing ink.

For example, as the color material dither matrices, dot-converged-type blue-noise-characteristic dither matrix in which landing positions converge to a small area is used as the rough-surface MTX 143. On the other hand, dot-dispersed type green-noise-characteristic dither matrix is used as the smooth-surface MTX 144.

In addition, as the color material pass masks, a pass mask that has a large landing time difference is used as the rough surface pass mask, and a pass mask that has a small landing time difference is used as the smooth surface pass mask.

In this manner, based on the roughness data, smooth reproduction of roughness change can be obtained.

The present invention is also applicable to printing methods other than the inkjet method. It can be applied to a sublimation method or an electrophotographic method of transferring powder or liquid color materials to an electrostatic latent image. Additionally, the present invention is similarly applicable to a printing apparatus that reproduces roughness using ultraviolet curing ink, a 3D printer that forms a three-dimensional object by layering and compressing resin or powder, and the like.

Furthermore, other than the image forming apparatus that forms an image using color materials on a printing medium, the present invention is similarly applicable to an image displaying apparatus that displays an image lighting pattern corresponding to input image data, such as a display or a projector. In the case of the image displaying apparatus, a plurality of image processing units that switches in accordance with the second data are included not in a printing material amount determination unit and a dot pattern determination unit but in a color conversion unit that converts an input color signal into a color signal (color component signal) which is to be displayed on the image display unit.

For example, if sharpness is used as the second data, a plurality of blurring filters which have different filter coefficients are held in the color conversion units. In the case of low sharpness, image processing using a filter that has a strong blurring intensity is performed in accordance with the switching signal GC. In the case of high sharpness, processing using a filter that has a weak blurring intensity is performed. In this manner, based on the sharpness image data, smooth reproduction of sharpness change can also be obtained in the image displaying apparatus.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   (a) at least one memory storing instructions; and
   (b) at least one processor executing the instructions to provide:
      (i) an input unit configured to input image data representing a color of an image, and information identifying high gloss and low gloss areas in the image;
      (ii) a first determination unit configured to determine, based on the image data, a recording amount of a printing material for forming the image on a recording medium; and
      (iii) a second determination unit configured to determine a dot arrangement of the printing material by halftone processing for the recording amount according to the information.

2. The image processing apparatus according to claim 1, wherein the second determination unit determines the dot arrangement by switching, based on the information, a first halftone processing and a second halftone processing different from the first halftone processing.

3. The image processing apparatus according to claim 2, wherein the first halftone processing is a halftone processing for arranging dots in a dispersed manner, and the second halftone processing is a halftone processing for concentrating dots.

4. The image processing apparatus according to claim 2, wherein the first halftone processing and the second halftone processing use different dither matrices.

5. The image processing apparatus according to claim 4, wherein the first halftone processing is a halftone processing using a blue-noise-characteristic dither matrix, and the second halftone processing is a halftone processing using a green-noise-characteristic dither matrix.

6. The image processing apparatus according to claim 1, wherein the information is a signal for switching processing, and the second determination unit determines the dot arrangement based on the signal and the recording amount.

7. The image processing apparatus according to claim 6, further comprising a generation unit configured to generate the signal based on a gloss range that can be reproduced by an image forming apparatus that forms the image and a predetermined threshold.

8. The image processing apparatus according to claim 7, wherein the threshold is a threshold included in a threshold matrix having a blue-noise-characteristic.

9. The image processing apparatus according to claim 8, wherein the threshold matrix used when the generation unit generates the signal and the dither matrix used when the second determination unit determines the dot arrangement are different in at least one of a threshold, screen angle, and number of screen lines.

10. The image processing apparatus according to claim 7, wherein the gloss range is acquired for each color represented by the image data.

11. The image processing apparatus according to claim 6, wherein the signal is a signal for switching the processing to either of processing for expressing low gloss and processing for expressing high gloss, and a difference between a gloss of the image formed according to the processing for expressing the low gloss and a gloss of the image formed according to the processing for expressing the high gloss is the largest if the image data is the same.

12. The image processing apparatus according to claim 1, wherein the first determination unit determines, based further on the information, the recording amount by switching between a first color separation processing and a second color separation processing, wherein the first color separation processing determines a recording amount of the recording material so as to use a large amount of dark color material, and the second color separation processing determines a recording amount of the recording material so as to use more light color material than the recording amount to be determined by the first color separation processing.

13. The image processing apparatus according to claim 1, further comprising a third determination unit configured to determine, based on the information, the dot arrangement for each recording scan by switching between a first pass-separation processing and a second pass-separation processing, wherein the first pass-separation processing disperses printing of dots in a plurality of printing scans, and the second pass-separation processing concentrates printing of dots on recording scans less than the dot arrangement of the recording material for each recording scan to be determined by the first pass-separation processing.

14. An image processing apparatus comprising:
   (a) at least one memory storing instructions; and
   (b) at least one processor executing the instructions to provide:
      (i) an input unit configured to input image data representing a color of an image, and information identifying high sharpness and low sharpness areas in the image;
      (ii) a first determination unit configured to determine, based on the image data, a recording amount of a printing material for forming the image on a recording medium; and
      (iii) a second determination unit configured to determine a dot arrangement of the printing material by halftone processing for the recording amount according to the information.

15. An image processing method comprising:
inputting, using an input unit, image data representing a color of an image, and information identifying high gloss and low gloss areas in the image;
determining, using a first determination, based on the image data, a recording amount of a printing material for forming the image on a recording medium; and
determining, using a second determination unit, a dot arrangement of the printing material by halftone processing for the recording amount according to the information.

16. An image processing method comprising:
inputting, using an input unit, image data representing a color of an image, and information identifying high sharpness and low sharpness areas in the image;
determining, using a first determination unit, based on the image data, a recording amount of a printing material for forming the image on a recording medium; and
determining, using a second determination unit, a dot arrangement of the printing material by halftone processing for the recording amount according to the information.

17. A non-transitory computer-readable recording medium storing a program that causes a computer to function as an image processing apparatus comprising:
   (a) an input unit configured to input image data representing a color of an image, and information identifying high gloss and low gloss areas in the image;
   (b) a first determination unit configured to determine, based on the image data, a recording amount of a printing material for forming the image on a recording medium; and
   (c) a second determination unit configured to determine a dot arrangement of the printing material by halftone processing for the recording amount according to the information.

18. A non-transitory computer-readable recording medium storing a program that causes a computer to function as an image processing apparatus comprising:
   (a) an input unit configured to input image data representing a color of an image, and information identifying high sharpness and low sharpness areas in the image;
   (b) a first determination unit configured to determine, based on the image data, a recording amount of a printing material for forming the image on a recording medium; and
   (c) a second determination unit configured to determine a dot arrangement of the printing material by halftone processing for the recording amount according to the information.

* * * * *